US012734515B2

(12) United States Patent
Parishan et al.

(10) Patent No.: US 12,734,515 B2
(45) Date of Patent: Sep. 15, 2026

(54) METHOD FOR PRODUCING A CORE-SHELL CATALYST

(71) Applicant: BASF SE, Ludwigshafen am Rhein (DE)

(72) Inventors: Samira Parishan, Ludwigshafen am Rhein (DE); Kazuhiko Amakawa, Ludwigshafen am Rhein (DE); Ulrich Hammon, Ludwigshafen am Rhein (DE); Christian Walsdorff, Ludwigshafen am Rhein (DE); Necip Neseli, Ludwigshafen am Rhein (DE); Markus Muehl, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 506 days.

(21) Appl. No.: 18/032,609

(22) PCT Filed: Oct. 20, 2021

(86) PCT No.: PCT/EP2021/079056
§ 371 (c)(1),
(2) Date: Apr. 19, 2023

(87) PCT Pub. No.: WO2022/090019
PCT Pub. Date: May 5, 2022

(65) Prior Publication Data

US 2024/0091756 A1 Mar. 21, 2024

(30) Foreign Application Priority Data

Oct. 29, 2020 (EP) .................................... 20204711

(51) Int. Cl.
*B01J 23/00* (2006.01)
*B01J 23/887* (2006.01)
(Continued)

(52) U.S. Cl.
CPC ......... *B01J 37/0215* (2013.01); *B01J 23/002* (2013.01); *B01J 23/8877* (2013.01);
(Continued)

(58) Field of Classification Search
CPC .... B01J 23/002; B01J 35/397; B01J 37/0215; B01J 2523/00; B01J 2523/17;
(Continued)

(56) References Cited

U.S. PATENT DOCUMENTS 3,147,084 A 9/1964 Franzen et al.
4,203,906 A 5/1980 Sato et al.
(Continued)

FOREIGN PATENT DOCUMENTS

CN 108855057 A * 11/2018 ............ C10G 2/331
CN 108855057 B * 1/2021 ............ C10G 2/332
(Continued)

OTHER PUBLICATIONS

Machine translation of Sun (CN108855057A) publication date Jan. 8, 2021.*
(Continued)

*Primary Examiner* — Jun Li
(74) *Attorney, Agent, or Firm* — Faegre Drinker Biddle & Reath LLP

(57) ABSTRACT

A process for producing an eggshell catalyst, comprising the coating of the outer surface of a geometric shaped support body with a catalytically active multielement oxide or a powder P, wherein the powder P, after being coated, is converted by thermal treatment to a catalytically active multielement oxide, and one or more liquid binders, wherein the coating is conducted in a horizontal mixer and the Froude number during the coating in the horizontal mixer is from 0.0160 to 0.1200.

8 Claims, 4 Drawing Sheets

(51) Int. Cl.

| | |
|---|---|
| ***B01J 35/30*** | (2024.01) |
| ***B01J 35/38*** | (2024.01) |
| ***B01J 35/55*** | (2024.01) |
| ***B01J 35/63*** | (2024.01) |
| ***B01J 37/00*** | (2006.01) |
| ***B01J 37/02*** | (2006.01) |
| *B01J 35/40* | (2024.01) |

(52) U.S. Cl.
CPC ............. *B01J 35/38* (2024.01); *B01J 35/395* (2024.01); *B01J 35/397* (2024.01); *B01J 35/55* (2024.01); *B01J 35/63* (2024.01); *B01J 37/0018* (2013.01); *B01J 35/40* (2024.01); *B01J 2235/00* (2024.01); *B01J 2523/17* (2013.01); *B01J 2523/53* (2013.01); *B01J 2523/55* (2013.01); *B01J 2523/68* (2013.01); *B01J 2523/69* (2013.01)

(58) Field of Classification Search
CPC ................ B01J 2523/55; B01J 2523/68; B01J 2523/69; B01J 2523/53; C07C 51/252; C07C 57/04
See application file for complete search history.

(56) References Cited

U.S. PATENT DOCUMENTS

| | | | |
|---|---|---|---|
| 5,144,091 A | 9/1992 | Martan et al. | |
| 5,739,391 A | 4/1998 | Ruppel et al. | |
| 6,403,829 B1 | 6/2002 | Unverricht et al. | |
| 7,253,308 B1 | 8/2007 | Hechler et al. | |
| 8,318,631 B2 | 11/2012 | Cremer et al. | |
| 9,238,217 B2 | 1/2016 | Welker-Nieuwoudt et al. | |
| 2004/0102648 A1 | 5/2004 | Borgmeier et al. | |
| 2006/0201573 A1 | 9/2006 | Petzoldt et al. | |
| 2008/0269521 A1 | 10/2008 | Hammon et al. | |
| 2011/0275856 A1 | 11/2011 | Karpov et al. | |
| 2014/0221683 A1 | 8/2014 | Welker-Nieuwoudt et al. | |
| 2015/0080605 A1* | 3/2015 | Welker-Nieuwoudt | C07C 51/235 502/251 |
| 2015/0246343 A1 | 9/2015 | Hammon et al. | |
| 2016/0244393 A1 | 8/2016 | Kurakami et al. | |
| 2023/0047536 A1* | 2/2023 | Chevalier | C09J 7/401 |

FOREIGN PATENT DOCUMENTS

| | | |
|---|---|---|
| DE | 2135620 A1 | 1/1973 |
| DE | 2201428 A1 | 7/1973 |
| DE | 2513405 A1 | 10/1976 |
| DE | 2830765 A1 | 1/1980 |
| DE | 2909671 A1 | 10/1980 |
| DE | 19910506 A1 | 9/2000 |
| DE | 19910508 A1 | 9/2000 |
| DE | 19927624 A1 | 12/2000 |
| DE | 19948241 A1 | 4/2001 |
| DE | 19948523 A1 | 4/2001 |
| DE | 19952964 A1 | 5/2001 |
| DE | 10051419 A1 | 4/2002 |
| DE | 10360057 A1 | 7/2004 |
| DE | 10350822 A1 | 6/2005 |
| DE | 10361456 A1 | 7/2005 |
| DE | 102005010645 A1 | 8/2005 |
| DE | 102004017150 A1 | 10/2005 |
| DE | 102007019597 A1 | 5/2008 |
| DE | 102008040093 A1 | 12/2008 |
| DE | 102008040094 A1 | 1/2009 |
| DE | 102008054586 A1 | 6/2010 |
| DE | 102014203725 A1 | 9/2015 |
| EP | 0383224 A2 | 8/1990 |
| EP | 0468290 A1 | 1/1992 |
| EP | 0700174 A1 | 3/1996 |
| EP | 0700893 A1 | 3/1996 |
| EP | 0714700 A2 | 6/1996 |
| EP | 0724481 A1 | 8/1996 |
| EP | 1322585 A2 | 7/2003 |
| EP | 1633467 A1 | 3/2006 |
| EP | 3056482 A1 | 8/2016 |
| JP | 58-096041 A | 6/1983 |
| JP | 2007-523734 A | 8/2007 |
| JP | 2007-260588 A | 10/2007 |
| JP | 2008-535646 A | 9/2008 |
| JP | 2012-005992 A | 1/2012 |
| JP | 2012-527502 A | 11/2012 |
| JP | 2013-529128 A | 7/2013 |
| JP | 2015-096497 A | 5/2015 |
| JP | 2016-536136 A | 11/2016 |
| JP | 2017-509477 A | 4/2017 |
| WO | 95/11081 A1 | 4/1995 |
| WO | 2004/085365 A2 | 10/2004 |
| WO | 2004/085367 A1 | 10/2004 |
| WO | 2004/085368 A2 | 10/2004 |
| WO | 2004/085369 A1 | 10/2004 |
| WO | 2004/085370 A1 | 10/2004 |
| WO | 2004/108267 A1 | 12/2004 |
| WO | 2004/108284 A1 | 12/2004 |
| WO | 2005/016861 A1 | 2/2005 |
| WO | 2005/042459 A1 | 5/2005 |
| WO | 2005/047226 A1 | 5/2005 |
| WO | 2005/120702 A1 | 12/2005 |
| WO | 2006/094766 A1 | 9/2006 |
| WO | 2006/114428 A1 | 11/2006 |
| WO | 2007/082827 A1 | 7/2007 |
| WO | 2008/104577 A1 | 9/2008 |
| WO | 2011/134932 A1 | 11/2011 |

OTHER PUBLICATIONS

Brunauer et al., "Adsorption of gases in multimolecular layers", Journal of the American chemical society, vol. 60, Issue 2, Feb. 1, 1938, pp. 309-319.

International Preliminary Report on Patentability received for PCT Patent Application No. PCT/EP2021/079056, mailed on May 11, 2023, 15 pages (9 pages of English Translation and 6 pages of Original Document).

International Search Report and Written Opinion received for PCT Patent Application No. PCT/EP2021/079056, mailed on Jan. 24, 2022, 12 pages (2 pages of English Translation and 10 pages of Original Document).

* cited by examiner

METHOD FOR PRODUCING A CORE-SHELL CATALYST

CROSS-REFERENCE TO RELATED APPLICATIONS

This application is a National stage application (under 35 U.S.C. § 371) of PCT/EP2021/079056, filed Oct. 20, 2021, which claims benefit of European Application No. 20204711.4, filed Oct. 29, 2020, both of which are incorporated herein by reference in their entirety.

The present invention relates to a process for producing an eggshell catalyst, comprising the coating of the outer surface of a geometric shaped support body with a catalytically active multielement oxide or a powder P, wherein the powder P, after being coated, is converted by thermal treatment to a catalytically active multielement oxide, and one or more liquid binders, wherein the coating is conducted in a horizontal mixer and the Froude number during the coating in the horizontal mixer is from 0.0160 to 0.1200.

The present invention also relates to the eggshell catalysts obtainable in accordance with the invention and to the use thereof for heterogeneously catalyzed partial gas phase oxidation over a fixed catalyst bed.

US 2011/0275856 describes the production of catalytically active multielement oxides comprising Mo, V and Cu. US 2014/0221683 describes the production of eggshell catalysts, wherein mixtures of catalytically active multielement oxides comprising Mo and V and oxides of molybdenum are used.

EP 3 056 482 A teaches the production of eggshell catalysts, wherein a shaped support body is coated with a multielement oxide comprising Mo and V and a binder, and the centrifugal acceleration during the coating is from 0.5 times to 30 times the acceleration due to gravity.

It is an object of the present invention to provide improved eggshell catalysts. The eggshell catalysts are especially to have a high pore volume and high abrasion resistance.

Accordingly disclosed is a process for producing an eggshell catalyst, comprising the coating of an outer surface of a geometric shaped support body with a) one or more catalytically active multielement oxides and one or more liquid binders, wherein the binder(s) is/are removed later, or b) one or more powders P and one or more liquid binders, wherein the powder(s) P, after the coating, is/are converted by thermal treatment to one or more catalytic reactive multielement oxides, wherein the coating is conducted in a horizontal mixer and the Froude number during the coating in the horizontal mixer is from 0.0040 to 0.1200.

The Froude number during the coating in the horizontal mixer is preferably from 0.0080 to 0.1000, more preferably from 0.0120 to 0.0800 and most preferably from 0.0160 to 0.0600.

For mixers with horizontally mounted mixing tools, the Froude number is defined as follows:

$$Fr = \frac{\omega^2 r}{g}$$

with r: radius of the mixing tool

ω: angular frequency g: acceleration due to gravity

A Froude number 0.1200 corresponds to a centrifugal acceleration of 0.1200 times the acceleration due to gravity.

The geometric shaped support bodies to be coated are introduced into a rotating vessel (e.g. coating tank). The rotating vessel has an angle of inclination of about 90° and is also referred to as a horizontal mixer. The rotating vessel conducts the especially spherical or cylindrical, in particular hollow cylindrical, shaped support bodies under two metering devices arranged in succession at a particular distance. The first metering device appropriately corresponds to a nozzle, by means of which the rolling geometric shaped support bodies are sprayed with the liquid binder and moistened in a controlled manner. The second metering device is disposed outside the atomization cone of the liquid binder sprayed in and serves to supply the catalytically active multielement oxide or the powder P (for example via an agitated channel). The geometric shaped support bodies moistened in a controlled manner take up the catalytically active multielement oxide or the powder P such that the rolling motion on the outer surface of the cylindrical or spherical shaped support bodies compacts it to form a coherent coating (such a compacting motion does not take place in the inner circle of a hollow cylindrical shaped support body, which is why it remains essentially uncoated). The catalytically active multielement oxide is also referred to hereinafter as active composition.

The mixing drum of the horizontal mixer preferably has a diameter of 0.5 to 2.5 m and/or a length of 0.25 to 1.5 m.

Geometric shaped support bodies used are preferably hollow cylindrical geometric shaped support bodies having a length of 3 to 8 mm, an external diameter of 4 to 8 mm and a wall thickness of 1 to 2 mm.

The eggshell catalyst preferably has an active composition content, based on the total mass, of 5% to 50% by weight.

In the coating operation, based on the active composition, preferably from 0.05 to 0.5 kg/kg, more preferably from 0.10 to 0.4 kg/kg, most preferably from 0.15 to 0.3 kg/kg, of the liquid binder is used.

The duration of coating preferably from 0.5 to 10 minutes, more preferably from 1.0 to 7 minutes, most preferably from 1.5 to 4 minutes, in each case per % by weight of active composition content.

The catalytically active multielement oxide comprises, for example, the elements Mo, V and optionally W or the elements Mo, Bi and optionally Fe.

The catalytically active multielement oxide preferably comprises the elements Mo, W, V, Cu and optionally Sb, wherein the ratio of the elements conforms to the general formula (I)

$$Mo_{12}W_aV_bCu_cSb_d \quad (I)$$

where a=0.4 to 5.0, preferably 0.6 to 3.5, more preferably 0.8 to 2.5, most preferably 1.0 to 2.0, b=1.0 to 6.0, preferably 1.5 to 5.5, more preferably 2.0 to 5.0, most preferably 2.5 to 4.5, c=0.2 to 3.0, preferably 0.4 to 2.8, more preferably 0.6 to 2.6, most preferably 0.8 to 2.4, and d=0.0 to 2.0, preferably 0.1 to 1.6, more preferably 0.2 to 2.4, most preferably 0.3 to 0.8, and the molar proportion of the element Mo in the total amount of all non-oxygen elements is from 5 to 95 mol %, preferably from 10 to 90 mol %, more preferably from 15 to 85 mol %, most preferably from 20 to 80 mol %.

The production of the catalytically active multielement oxides is known to the person skilled in the art, for example from US 2011/0275856 and US 2014/0221683.

For production of the catalytically active multielement oxide, suitable sources of the elemental constituents are used to produce an aqueous solution or aqueous suspension. This is described by way of example for a catalytically active multielement oxide comprising the elements Mo, W, V, Cu and optionally Sb:

First of all, sources of the elemental constituents V, Mo, W and optionally Sb are used to produce an aqueous solution or aqueous suspension. The sequence of addition is not subject to any restriction.

The pH is preferably from 3 to 8, more preferably from 4 to 7, most preferably from 5 to 7.

Ammonium paratungstate heptahydrate is the preferred source for the elemental constituent W. Ammonium heptamolybdate tetrahydrate is the preferred source for the elemental constituent Mo. Ammonium metavanadate is the preferred source for the elemental constituent V. Antimony (III) acetate or antimony(III) oxide are the preferred sources for the elemental constituent Sb.

Other useful sources for the elemental constituents aside from oxides are quite generally, in particular, metalates, polymetalates, halides, nitrates, formates, oxalates, acetates, carbonates and hydroxides.

If the solubility of a source of a possible elemental constituent in aqueous medium is intrinsically inadequate for the purposes of the process of the invention, it is possible, for example, to modify the pH of the aqueous medium by addition of appropriate modifiers, in order to improve the solubility of the source of an elemental constituent in the aqueous medium. Suitable modifiers include particularly those Brønsted acids and Brønsted bases which decompose to gaseous constituents under the action of elevated temperatures, as employed in the thermal treatment of the geometric shaped precursor bodies to form the desired catalytically active multielement oxide. Examples of such pH modifiers include ammonia, nitric acid, hydrochloric acid, acetic acid, formic acid, oxalic acid and ammonium salts of strong and weak Brønsted acids, such as ammonium nitrate, ammonium chloride, ammonium carbonate, ammonium hydrogencarbonate, ammonium acetate, ammonium formate and ammonium oxalate.

Alternatively and/or additionally, complexing agents soluble in the aqueous medium can also be added thereto, these decomposing to gaseous compounds and/or escaping as gaseous compounds under the action of elevated temperatures, at least in the presence of molecular oxygen, and being able to complex elemental constituents in ionic form, which generally likewise leads to an improvement in solubility in the aqueous medium. Examples of such complexing agents include ammonia and ethylenediaminetetraacetic acid and salts thereof, preferably those of good water solubility.

A further measure for improving solubility in an aqueous medium is the employment of elevated temperatures. It is of course also possible to simultaneously employ more than one of the various options addressed for improving solubility in the aqueous medium.

The solubility of the at least one source of the elemental constituents W depends on the sequence of metered addition. The source of the elemental constituents W should therefore be metered in before the sources of the elemental constituents Mo, V and optionally Sb. However, a different sequence of metered addition is also possible in principle.

Thereafter, the resultant aqueous solution or aqueous suspension is admixed with sources of the elemental constituents Cu and optionally Sb. The source for the elemental constituent Cu is advantageously added here in solid form.

The pH is preferably from 3 to 8, more preferably from 4 to 7, most preferably from 5 to 7.

Useful sources for the elemental constituent Cu for the production of multielement oxides according to the invention especially include copper(II) sulfate pentahydrate, copper(II) nitrate hydrate (Cu content=26.1% by weight) and copper(II) acetate monohydrate, among which the latter is preferred. Antimony(III) acetate or antimony(III) oxide are the preferred sources for the element constituent Sb.

As well as the sources of the elemental constituents Mo, W, V, Cu and optionally Sb, it is possible to add further sources of elemental constituents in the process of the invention, for example Ta, Cr, Ce, Ni, Co, Fe, Mn, Zn, Nb, Bi, Li, Na, K, Rb, Cs, Mg, Ca, Sr, Ba, Si, Al, Ti and Zr.

By spray-drying the aqueous solution or aqueous suspension, it is possible to produce a powder P directly.

In the spray-drying operation, the aqueous solution or aqueous suspension is appropriately introduced by means of a nozzle which can be operated by liquid pressure, compressed air or inert gas, or by means of rotating atomizer disks, divided into fine droplets into a hot gas stream, preferably into a hot air stream, which dries it within fractions of a second to give the powder P. The hot gas stream may in principle flow in the direction counter to the spray jet, i.e. in countercurrent, or preferably with the spray jet, i.e. in cocurrent. The spray tower may be operated with a gas stream preheated directly or indirectly. Preference is given to using a directly heated gas stream in which hot fuel gas generated, for instance, by combustion of a fuel, for example methane, is mixed with an additional air stream, for example, and run to the spray tower. Typical inlet temperatures for the hot gas stream are in the range from 250 to 290° C., preferably in the range from 270 to 380° C., and typical outlet temperatures are in the range from 90 to 150° C. The residual water content of the resulting powder P, based on the total mass thereof, is appropriately not more than 10% by weight and particularly appropriately not more than 6% by weight. Low residual water contents are advantageous. In general, the aforementioned residual water content is typically at least 0.5% by weight, frequently at least 2% by weight. Analyses for residual water content in this document are based generally on the determination thereof with the aid of the HB43 Moisture Analyser from Mettler Toledo AG Laboratory & Weighing Technologies in CH-8606 Greifensee. For this purpose, about 5 g of powder P is heated to 120° C. by means of infrared radiation within about 50 seconds and kept at that temperature. The measurement is ended when the weight loss within 20 seconds is less than 1 mg.

In general, powders P obtainable as described have comparatively homogeneous particle diameters.

On the way from the site of production thereof to the spray drying apparatus, the aqueous solution or aqueous suspension to be spray dried is advantageously passed through at least one suitable sieve, in order to remove any coarse particles present therein, which could, for example, block the spray nozzles, prior to the entry thereof into the spray drying apparatus. The temperature of the conveying conduit is kept at the final value of the production temperature of the aqueous solution or of the aqueous suspension. The residual solution or residual suspension which is yet to be spray dried in each case is advantageously mixed constantly by stirring and kept at the starting temperature relevant for the spray drying thereof.

In industry, the aqueous solution or aqueous suspension to be spray dried is normally produced in stirred vessels manufactured from stainless steel of the 1.4541 type (DIN 10020). The spray drying apparatus and the stirrer are appropriately manufactured from the same material.

The resultant powder P can be subjected to direct thermal treatment (also referred to as calcining) to form the catalytically active multielement oxide. It is alternatively possible however first to produce geometric shaped precursor bodies.

The geometric shaped precursor bodies to be subjected to thermal treatment may be produced from the powder P in the individual case by different process variants.

In a simple embodiment, the powder P is used to directly form geometric shaped precursor bodies of any desired geometry by compaction, such as press agglomeration or tableting (as indicated by way of example, for example, in documents DE 10 2008 054586 A, DE 10 2008 040093 A and DE 10 2008 040094 A for comparable pulverulent mixtures). Examples of shaped precursor body geometries typical in accordance with the invention are spheres (the diameter of which may, for example, be from 2 to 10 mm), and also solid cylinders or hollow cylinders (rings) having an external diameter and a length of typically from 2 to 10 mm. In the case of the hollow cylinder, a wall thickness of 1 to 3 mm is appropriate.

It is of course possible to additionally mix auxiliaries for subsequent shaping (shaping auxiliaries) into the powder P. Useful auxiliaries include glidants or lubricants such as graphite, carbon black, polyethylene glycol, stearic acid, salts of stearic acid, starch, polyacrylic acid, mineral oil, vegetable oil, water, boron nitride, boron trifluoride, glycerol, fine Teflon powder and/or cellulose ether.

The aforementioned lubricants may partly or fully decompose and/or be chemically converted in the course of the thermal treatment of the geometric shaped precursor bodies, possibly to form substances which escape in gaseous form.

As further shaping assistants, the mixture to be compacted may comprise added reinforcing agents, which promote coherence in the resulting geometric shaped precursor bodies. Such reinforcing agents may, for example, be microfibers of glass, asbestos, silicon carbide and/or potassium titanate.

In contrast to the lubricants, reinforcing assistants are normally essentially preserved in the course of the inventive thermal treatment of the geometric shaped precursor bodies.

It is of course also possible to additionally mix in lubricants and reinforcing agents together.

Based on the total amount of a pulverulent mixture to be compacted to shaped precursor bodies, the total amount of shaping assistants present will generally not be more than 30% by weight, usually not more than 20% by weight and in many cases not more than 10% by weight (but frequently at least 0.1% by weight, or at least 0.2% by weight, or at least 0.5% by weight, or at least 1% by weight).

If the shaping in the production of the geometric shape because the bodies is effected by extrusion or strand pressing, it is advantageous to additionally mix in at least one liquid (a liquid binder). This liquid is preferably water, an aqueous solution and/or constituents of an aqueous solution. Advantageously, at least one aforementioned liquid shaping assistant incorporated is a lower ($C_2$ to $C_5$) organic carboxylic acid (e.g. formic acid, acetic acid (preferred), propionic acid, fumaric acid and/or maleic acid or the respective aqueous solution thereof and/or the constituents of such an aqueous solution).

Calculated as pure lower organic carboxylic acids, these (preferably acetic acid) are advantageously incorporated overall in a total amount of 5 to 15% by weight, based on the content of powder P in the overall mixture. The total water content of the resulting overall mixture may be from 5% to 45% by weight, preferably from 10% to 30% by weight.

The incorporation of one or more lower organic carboxylic acids (preferably acetic acid) and/or aqueous solutions thereof is appropriately effected by kneading with maximum homogeneity. The temperature in the course of kneading will generally not be more than 50° C. Typically, the aforementioned temperature is in the range from 20 to 50° C., appropriately in the range from 30 to 40° C. The kneading takes preferably less than 12 hours, more preferably from 10 to 360 minutes, most preferably from 20 to 120 minutes.

The resulting plastically formable mass (the resulting kneading material, the resulting kneading composition) is subsequently shaped by extrusion to shaped bodies (shaped precursor bodies) of the desired geometry. In the simplest case, these may be strands (solid cylinders). Of course, rings are also possible extrudates in accordance with the invention.

In the case of geometric shaped precursor bodies obtained by extrusion, a thermal treatment thereof includes the drying thereof. In general, this drying is effected at temperatures of less than 200° C., preferably of not more than 150° C., but typically at temperatures of at least 60° C., or at least 80° C., or at least 100° C.

Subsequently, the powder P produced or the shaped precursor bodies produced are subjected to thermal treatment to form the catalytically active multielement oxide (also referred to as calcination).

The calcination is conducted at end temperatures of 200 to 600° C., preferably of 300 to 500° C., more preferably of 370 to 430° C. (material temperature in each case). Especially during the calcination, the material, advantageously in accordance with the invention, has a very substantially uniform temperature.

The calcination can be performed batchwise or continuously.

In the case of batchwise calcination, it is possible to employ temperature programs with one or more temperature plateaus, as described in EP 1 633 467 A. The heating rate is preferably from 0.1 to 20 K/min, more preferably from 0.5 to 10 K/min, most preferably from 1 to 5 K/min.

In the case of continuous calcination, the material migrates through an oven. The calcination may be conducted here isothermally or using different temperature zones, as described in EP 1 322 585 A. The temperature of the first temperature zone is preferably at least 30° C. lower than the highest temperature of the other temperature zones.

The calcination may be conducted in a stationary or moving bed of the powder P or of the shaped precursor bodies. The calcination of the shaped precursor bodies is preferably conducted in a moving bed. Suitable apparatuses are rotary furnaces as described in EP 1 633 467 A, or belt calciners as described in EP 1 322 585 A. Rotary furnaces are preferred.

The thermal treatment (especially the calcination) of the powder P or of the geometric shaped precursor bodies can be performed either under inert gas or under an oxidative (gas) atmosphere, for example air (or another mixture of inert gas and oxygen), or else under a reducing atmosphere (for example mixtures of inert gas and reducing gases such as hydrogen, ammonia, carbon monoxide, methane and/or acrolein or said reducing gases alone) (it will be appreciated that an atmosphere having reducing action overall may also have a limited content of molecular oxygen). The oxidative (gas) atmosphere preferably comprises from 0.1% to 10% by volume, more preferably from 0.5% to 5% by volume, most preferably from 1% to 2% by volume, of molecular oxygen. The preferred oxidative (gas) atmospheres comprise, as well as molecular oxygen, inert gases such as nitrogen, and water vapor. The water vapor content is preferably less than 5% by volume, more preferably less than 2% by volume. Oxygen contents above and below the aforementioned limits can reduce the resulting catalytic activity. The thermal treatment can in principle alternatively be effected under reduced pressure.

In the calcination, there can be uncontrolled generation of heat in the powder P or in the shaped precursor body, resulting in damage to the catalytically active multielement oxide to be produced. When ammonium salts are used, for example at temperatures of 150 to 350° C., ammonia can be released during the calcination and can burn. The uncontrolled generation of heat can be limited by sufficient exchange of heat and gas. It is alternatively possible to adjust the amount of material to be calcined, the amount and the composition of the atmosphere, and the temperature program.

If the thermal treatment of the powder P or of the geometric shaped precursor bodies is effected under gaseous atmosphere, this may either be stationary or may flow.

Overall, the thermal treatment (especially the calcination) of the powder P or of the geometric shaped precursor bodies may take up to 24 h or more. Frequently, the thermal treatment (especially the calcination) extends over a period of minutes up to a few hours, for example from 0.5 to 10 hours, or from 1 to 5 hours. Elevated temperatures are normally associated with shorter durations of the thermal treatment (especially of the calcination) and, at lower temperatures, generally longer periods of thermal treatment (especially of the calcination) are employed. High temperatures and long treatment times (especially of the calcination) generally reduce the specific surface area of the catalytically active multielement oxides which result in the course of thermal treatment of the geometric shaped precursor bodies (of the precursor composition).

The thermal treatment (especially the calcination) of the geometric shaped precursor bodies is preferably effected in a gas atmosphere comprising oxygen.

The resulting catalytic activity of the catalytically active multielement oxide obtained in the thermal treatment generally exhibits an optimum depending on the oxygen content of the calcination atmosphere.

Calcination processes suitable in accordance with the invention are disclosed, for example, by documents WO 2004/108284, EP 0 724 481 A, WO 2008/104577, WO 2004/108267 and WO 95/11081, among which the calcination process disclosed in the latter WO document is especially preferred.

The catalytically active multielement oxides are converted to a finely divided form (for example comminuted to powder or spall, for example by grinding), and this finely divided form is applied as a shell of the catalytically active multielement oxide to the outer surface of a geometric shaped support body (to obtain what is called an eggshell catalyst).

The specific BET surface area of the catalytically active multielement oxides is typically from 10 to 35 $m^2/g$, preferably from 11 to 35 $m^2/g$, more preferably from 12 to 25 $m^2/g$, most preferably from 13 to 20 $m^2/g$ (determined by gas adsorption ($N_2$) according to Brunauer-Emmett-Teller (BET)). A description of the BET determination method can be found in DIN ISO 9277 and in J. Am. Chem. Soc. Vol. 60, No. 2, pages 309-319 (1938).

The application is conducted with the aid of a liquid binder. It functions as a bonding fluid, with the aid of which the finely divided catalytically active multielement oxide is bonded to the outer surface of the geometric shaped support body. Subsequently, the adhesion fluid can be at least partly removed again from the coated geometric shaped support body (for example by passing over hot gas, as described in WO 2006/094766). The residual water content of the resulting catalyst is preferably not more than 1.0% by weight, more preferably not more than 0.5% by weight, most preferably not more than 0.2% by weight, based in each case on the total mass of the catalyst.

Useful materials for the geometric shaped support bodies especially include aluminas, silicas, silicates such as clay, kaolin, steatite (preferably C-220 steatite from Ceram Tec (DE), or preferably with a low water-soluble alkali content), pumice, aluminum silicate, magnesium silicate, silicon carbide and zirconia. The geometric shaped support bodies are appropriately substantially inert with respect to the relevant partial oxidation (i.e., when they are used alone as "catalysts" for the corresponding heterogeneously catalyzed partial gas phase oxidation of, for example, acrolein to acrylic acid, they are largely inert, meaning that they cause essentially no conversion of the acrolein).

The outer surface of the geometric shaped support body may be either smooth or rough. Advantageously, the outer surface of the geometric shaped support body is rough, since increased surface roughness generally causes increased bond strength of the catalytically active multielement oxides applied.

Useful geometric shaped support bodies having distinct surface roughness include especially shaped support bodies having a grit layer on their outer surface (geometric shaped support bodies preferred in accordance with the invention are hollow cylinders with a grit layer on their outer surface).

The surface roughness $R_Z$ of the outer surface of the geometric shaped support bodies is preferably in the range from 30 to 100 μm, more preferably in the range from 50 to 70 μm (determined to DIN 4768 Sheet 1 with a "Hommel Tester for DIN-ISO surface measurement parameters" from Hommelwerke). Particular preference is given to rough-surface geometric shaped support bodies from Ceram Tec made of C220 steatite.

The support materials may be porous or nonporous. The support material is preferably nonporous (the total volume of the pores of the geometric shaped support body is, based on the volume of the respective geometric shaped support bodies, advantageously not more than 1% by volume). The specific (based on the unit of its mass) BET surface area of the support material is accordingly preferably low.

The geometric shaped support bodies may be of regular or irregular shape, preference being given to regularly shaped geometric shaped support bodies.

The longest extent of the geometric shaped support bodies is normally in the range from 1 to 10 mm (the longest extent is the longest direct line connecting two points on the outer surface of a shaped support body).

Preference is given to employing spheres or (solid) cylinders, especially hollow cylinders (rings), as geometric shaped support bodies. Favorable diameters for support spheres are from 3 to 9 mm. If cylinders are used as geometric shaped support bodies, the length thereof is preferably from 2 to 10 mm and the external diameter preferably from 4 to 10 mm. In the case of rings, the wall thickness is additionally typically from 1 to 4 mm. Hollow cylindrical geometric shaped support bodies of length 3 to 8 mm, external diameter 4 to 8 mm and wall thickness 1 to 2 mm are very particularly preferred geometric shaped support bodies. Examples of favorable ring geometries for shaped support bodies include hollow cylinders of geometry 7 mm×3 mm×4 mm (external diameter×length×internal diameter) and of geometries 6 mm×6 mm×4 mm, 7 mm×7 mm×5 mm and 5 mm×3 mm×2 mm. Favorable geometric shaped support bodies are also all shaped support bodies disclosed in Research Disclosure Database Number 532036 in August 2008 (especially all those disclosed by way of example). The production of eggshell catalysts CE and IE disclosed in the present document can also be performed with any annular shaped support body disclosed by way of example therein (especially with those of geometry 7 mm×3 mm×4 mm or 6 mm×6 mm×4 mm).

The thickness of the shell of catalytically active multielement oxide applied to the outer surface of the geometric shaped support bodies (especially of the above-detailed annular shaped support bodies, the outer surface of which also includes the surface delineating the cavity of the ring) is appropriately and generally 10 to 1000 μm. This shell thickness in the case of eggshell catalysts is preferably from 10 to 500 μm, more preferably from 30 to 450 μm and most preferably from 50 to 400 μm.

Advantageously, the shell thickness is very substantially homogeneous over an individual eggshell catalyst. In the case of production of a relatively large production batch of eggshell catalysts, the shell thickness is likewise very substantially homogeneous over several individual eggshell catalyst ring bodies. The aforementioned homogeneity of the shell thickness is appropriately frequently within the range of those figures which have been given in the working examples of DE 103 A1.

The finely divided catalytically active multielement oxide can be applied to the outer surface of the geometric shaped support body, for example, by first moistening the outer surface with the liquid binder in a controlled manner (for example by spraying). By contacting the geometric shaped support body thus moistened with the finely divided catalytically active multielement oxide, a layer of the active composition is subsequently fixed on the moistened surface (for example, dust the moistened geometric shaped support bodies as described in EP 0 714 700 A with the finely divided catalytically active multielement oxide).

In this context, "moisten in a controlled manner" means that the support surface is appropriately moistened in such a way that it does have adsorbed liquid binder, but no liquid phase as such is visually apparent on the support surface. If the support surface is too moist, the finely divided catalytically active multielement oxide agglomerates to give separate agglomerates, rather than adhering to the surface. Details of this can be found in DE 29 09 671 A and in DE 100 51 419 A, and also in EP 0 714 700 A. It will be appreciated that the operation can be repeated periodically to achieve an increased layer thickness. In this case, the coated base body becomes the new "support body", etc.

It is alternatively possible to employ all other application processes acknowledged as prior art in EP 0 714 700 A for production of the above-detailed eggshell catalysts.

Examples of useful liquid binders include water, an organic solvent or a solution of an organic substance (for example of an organic solvent) in water, or in an organic solvent, or in an aqueous solution of an organic solvent. Examples of organic binders include mono- or polyhydric organic alcohols, such as ethylene glycol, 1,4-butanediol, 1,6-hexanediol or glycerol, mono- or polybasic organic carboxylic acids such as propionic acid, oxalic acid, malonic acid, glutaric acid or maleic acid, amino alcohols such as ethanolamine or diethanolamine, and mono- or polyfunctional organic amides such as formamide. Suitable organic binder promoter constituents (binder promoters) soluble in water, in an organic liquid or in a mixture of water and an organic liquid are monosaccharides and oligosaccharides such as glucose, fructose, sucrose and/or lactose.

Particularly advantageously, the liquid binder used is a solution consisting of 20% to 90% by weight of water and 10% to 80% by weight of an organic compound. The organic component in the aforementioned liquid binders is preferably 10% to 50% by weight and more preferably 20% to 30% by weight. Very particularly preferred liquid binders are solutions which consist of 20% to 90% by weight of water and 10% to 80% by weight of glycerol. Advantageously, the glycerol content in these aqueous solutions is 10% to 50% by weight and more preferably 20% to 30% by weight. One reason for the advantage of preferred binders is that they are able to fully satisfactorily wet both the finely divided catalytically active multielement oxide and the outer surface of the geometric shaped support bodies.

The fineness of the finely divided catalytically active multielement oxide to be applied on the outer surface of the geometric shaped support body will of course be matched to the desired shell thickness. For the shell thickness range from 50 to 500 μm, suitable active composition powders are those of which at least 50% of the total number of the preferably granular powder particles pass through a sieve of mesh size (circular meshes) 1 to 20 μm or alternatively 1 to 10 μm, and wherein the numerical proportion of particles having a longest dimension above 50 μm (of particles which do not pass through a sieve of mesh size (circular meshes) 50 μm) is less than 10%. For the rest, the statements made on page 18 of WO 2005/120702 are correspondingly applicable.

Eggshell catalysts obtainable as described will preferably be obtained by the mode of production described and detailed by way of example in EP 0 714 700 A (see also WO 2011/134932 and the working examples of DE 103 60 057 A). An aqueous solution of 75% by weight of water and 25% by weight of glycerol is the preferred liquid binder. The process for thermal treatment of the geometric shaped precursor bodies will, advantageously in accordance with the invention, be performed according to the procedure described and detailed by way of example in DE 103 60 057 A.

The binder is removed later, for example in an air stream at 300° C. This can be effected immediately after the coating or only after introduction into the reactor used for the heterogeneously catalyzed gas phase oxidation.

It is alternatively possible first to coat the geometric shaped support bodies with one or more powders P and one or more liquid binders and to convert the powder(s) P, after the coating, by thermal treatment (calcination) to one or more catalytically active multielement oxides. In this process variant, the binder is removed in the thermal treatment.

The eggshell catalysts are especially suitable for catalysis of a heterogeneously catalyzed partial gas phase oxidation of acrolein to acrylic acid, as described in WO 2007/082827, WO 2004/085365, WO 2004/085367, WO 2004/085368, WO 2004/085369, WO 2004/085370, WO 2005/016861, WO 2005/047226 and WO 2005/042459. They are notable especially in that a catalyst bed charged therewith, in the course of performance of the partial oxidation, has a long service life during which the target product is formed with high selectivity. The preferred use form of an eggshell catalyst obtainable in accordance with the invention is that which preferably has an annular geometry. Particular preference is given here to using the eggshell catalyst detailed by way of example in the example of the present document, for example in all working examples and in all comparative examples of the above WO documents WO 2007/082827, WO 2004/085365, WO 2004/085367, WO 2004/085368, WO 2004/085369, WO 2004/085370, WO 2005/016861, WO 2005/047226 and WO 2005/042459, in each of which it is capable of replacing the catalyst used therein (the statements made therein for the eggshell catalyst from the example of the present document are also applicable to the eggshell catalyst from the comparative example of the present document).

In principle, the eggshell catalysts, in a correspondingly advantageous manner, are alternatively suitable for catalysis of the heterogeneously catalyzed partial gas phase oxidation of methacrolein to methacrylic acid.

The above is applicable particularly when the heterogeneously catalyzed partial gas phase oxidation of acrolein or methacrolein (i.e., in abbreviated form, of "(meth)acrolein") to acrylic acid or methacrylic acid (i.e., in abbreviated form, to "(meth)acrylic acid") is performed at high (meth)acrolein loads, as described, for example, in DE 103 07 983 A, DE 199 48 523 A, DE 199 10 508 A, WO 2008/104577, WO 2011/134932, DE 199 27 624 A and DE 103 60 057 A.

The heterogeneously catalyzed partial gas phase oxidation can be performed in a manner known per se. In other words, a reaction gas mixture comprising the (meth)acrolein, molecular oxygen and at least one inert diluent gas is conducted at elevated temperature through a catalyst bed, and the conversion thereof to (meth)acrylic acid is effected during the residence time of the (meth)acrolein in the catalyst bed. In general, steam as a constituent of the reaction gas mixture leads to an improvement in selectivity and activity. In addition, inert diluent gases having elevated molar specific heat, such as n-propane or carbon dioxide, are advantageous. These are gases that undergo chemical change as the reaction gas mixture passes through the catalyst bed preferably to an extent of not more than 5 mol %, more preferably to an extent of not more than 3 mol %, most preferably to an extent of not more than 1 mol %, or not at all.

For performance of the gas phase partial oxidation of (meth)acrolein, heat exchanger reactors in particular are suitable. A heat exchanger reactor has at least one primary space and at least one secondary space, which are separated from one another by a dividing wall. In the at least one primary space is positioned the catalyst charge which comprises at least one catalytically active multielement oxide which is obtainable in accordance with the invention and through which a reaction gas mixture comprising (meth) acrolein flows. At the same time, a fluid heat carrier flows through the secondary space and heat exchange takes place between the two spaces through the dividing wall, the purpose of which is to monitor and to control the temperature of the reaction gas mixture on its way through the catalyst bed.

In general, the gas phase partial oxidation of the (meth) acrolein is performed in a shell-and-tube (heat exchanger) reactor having one or more temperature zones, as described, for example, in EP 0 700 174 A, EP 0 700 893 A, DE 199 10 508 A, DE 199 48 523 A, DE 199 10 506 A, DE 199 48 241 A, DE 28 30 765 A, DE 25 13 405 A, U.S. Pat. No. 3,147,084, DE 22 01 428 A, EP 0 383 224 A, JP 2007-260588 and JP S58-096041.

A fixed catalyst bed here takes the form of a corresponding bed of eggshell catalysts in the metal tubes (catalyst tubes) of the shell-and-tube reactor, the temperature medium is, or the temperature media are, conducted around the metal tubes (in the case of more than one temperature zone, a corresponding number of spatially essentially separate temperature media are conducted around the metal tubes). The fixed catalyst bed may have sections of different activity, for example through use of catalysts of different activity or through dilution with inert geometric shaped bodies. The temperature medium is generally a salt melt. The reaction gas mixture is conducted through the catalyst tubes.

Alternatively, the fixed catalyst bed may also be within the spaces between thermoplates, through which a heat carrier flows, in a thermoplate reactor, as recommended in DE 10 2004 017 150 A, DE 199 52 964 A and DE 103 61 456 A.

The fixed catalyst bed may, as already stated, quite generally consist only of eggshell catalysts obtainable in accordance with the invention, but also of such eggshell catalysts diluted with inert geometric shaped bodies. The inert geometric shaped bodies here may be the geometric shaped support bodies (support bodies) used for production of inventive eggshell catalysts. Upstream of and/or beyond the fixed bed catalyst may be disposed a bed purely of inert shaped bodies (such beds purely of inert shaped bodies are not normally included in the calculation of the space velocity of reaction gas or of a reaction gas component on the fixed catalyst bed).

Catalyst tubes used in a shell-and-tube reactor are customarily manufactured from ferritic steel and typically have a wall thickness of 1 to 3 mm. Their internal diameter is generally from 20 to mm, frequently from 21 to 35 mm or from 22 to 30 mm. Their length is appropriately from 2 to 8 m, frequently from 3 to 6 m.

The number of catalyst tubes accommodated in the shell and tube vessel appropriately runs to at least 5000, preferably to at least 10000. Frequently, the number of catalyst tubes accommodated in the reaction vessel is 15 000 to 40 000. Shell and tube reactors having a number of catalyst tubes exceeding 50 000 are usually exceptional. Within the vessel, the catalyst tubes are normally arranged in homogeneous distribution (preferably 6 equidistant neighboring tubes per catalyst tube), the distribution appropriately being selected such that the separation of the central internal axes of mutually adjacent catalyst tubes (called the catalyst tube pitch) is 35 to 45 mm (cf., for example, EP 0 468 290 A).

A particularly favorable heat exchange medium for shell-and-tube reactors is the use of melts of salts such as potassium nitrate, potassium nitrite, sodium nitrite and/or sodium nitrate, or of low-melting metals such as sodium, mercury and alloys of different metals.

Charging of catalyst tubes in shell-and-tube reactors with eggshell catalysts obtainable in accordance with the invention (especially those detailed in the example (but also in the comparative example) of the present document) is advantageous particularly when the shell-and-tube reactor is operated at a (meth)acrolein space velocity on the catalyst charge of at least 130 l (STP)/l·h, or at least 150 l (STP)/l·h, or at least 160 l (STP)/l·h, or at least 170 l (STP)/l·h, or at least 180 l (STP)/l·h, or at least 200 l (STP)/l·h, or at least 220 l (STP)/l·h, or at least 240 l (STP)/l·h, or at least 260 l (STP)/l·h. Of course, such a catalyst charge is also advantageous in the case of smaller (for example not more than 130 l (STP)/l·h, or not more than 100 l (STP)/l·h, or not more than 80 l (STP)/l·h, or not more than 60 l (STP)/l·h) (meth)acrolein space velocities.

In general, the (meth)acrolein space velocity on the catalyst charge will be at least 400 l (STP)/l·h, or at least 350 l (STP)/l·h, or at least 300 l (STP)/l·h, or at least 280 l (STP)/l·h (corresponding space velocities can also be implemented in thermoplate reactors).

The space velocity of reaction gas input mixture on a fixed catalyst bed is understood in this document to mean the flow rate of reaction gas input mixture in standard liters (=l (STP); the volume in liters that the corresponding gas volume would occupy under standard conditions, i.e. at 0° C. and 101.3 kPa) which is supplied to the fixed catalyst bed, based on the volume of the bed thereof (bed sections composed purely of inert material are not included in the volume of the bed; incidentally, the volume of a bed is the volume of the empty space occupied by the bed (or by the relevant sections thereof)), i.e. based on the bed volume thereof, per hour (→unit=l (STP)/l·h).

The space velocity may also be based only on one constituent of the reaction gas input mixture (for example only on the organic starting compound to be partially oxidized). In that case, it is correspondingly the volume of this constituent (for example of the organic starting compound of the partial oxidation) in standard liters which is supplied to the fixed catalyst bed, based on the volume of the bed thereof (bed sections composed purely of inert material are not included in the volume of the bed; incidentally, the volume of a bed is the volume of the empty space occupied by the bed (or by the relevant sections thereof)), per hour (→unit=l (STP)/l·h).

The volume-specific activity of the fixed catalyst bed will generally be configured such that it increases in flow direction of the reaction gas.

This can be achieved in a simple manner by decreasing the level of dilution of the fixed catalyst bed with inert shaped bodies in flow direction of the reaction gas. The volume-specific activity can alternatively be adjusted by using catalysts having different specific BET surface area. It is additionally possible to use eggshell catalysts having different pore volume or different eggshell thickness. Activity increases here with increasing specific BET surface area, pore volume or eggshell thickness.

Otherwise, the heterogeneously catalyzed partial oxidation with eggshell catalysts obtainable in accordance with the invention can quite generally be performed in all aspects as detailed, for example, by DE 103 50 822 A. The (meth) acrolein content in the reaction gas input mixture may have values of 3% to 15% by volume, frequently of 4% to 10% by volume, or of 5% to 8% by volume (based in each case on the total volume of the reaction gas input mixture).

The molar ratio of oxygen to (meth)acrolein in the reaction gas input mixture will normally be at least 1. Typically, this ratio will have values of not more than 3. In many cases, the heterogeneously catalyzed (meth)acrolein partial oxidation to (meth)acrylic acid will be executed with a (meth) acrolein to oxygen to steam to inert gas volume ratio (l (STP)) of 1:(1 to 3):(0 to 20):(3 to 30), preferably of 1:(1 to 3):(0.5 to 10):(7 to 10).

Useful inert diluent gases (these are gases or mixtures of those gases which, in single pass of the reaction gas mixture through the catalyst bed (e.g. a fixed catalyst bed), are preserved chemically unchanged to an extent of at least 95 mol %, preferably to an extent of at least 97 mol % or to an extent of at least 99 mol %, and at best to an extent of 100 mol %) include nitrogen, carbon dioxide, carbon monoxide, noble gases, propane, ethane, methane, butane and/or pentane (i.e. each as a sole diluent gas or in a mixture with one other inert diluent gas or with a plurality of other inert diluent gases among these). The reaction temperatures in such a heterogeneously catalyzed (meth)acrolein partial oxidation are typically in the range from 200 to 400° C., generally from 220 to 380° C., in many cases from 230 to 350° C., frequently from 245 to 285° C. or from 245 to 265° C. The working pressure (absolute pressure) is normally 101.3 to 350 kPa, or 101.3 to 250 kPa, or 101.3 to 205 kPa (especially as the input pressure into the fixed catalyst bed). The (meth)acrolein partial oxidation with the catalysts obtainable in accordance with the invention can of course also be performed at working pressures below atmospheric pressure.

The (meth)acrolein conversion, based on a single pass of the reaction gas mixture through the, for example, fixed catalyst bed, is typically at least 90 mol %, frequently at least 98 mol %, and in many cases at least 99 mol %, or even at least 99.9 mol %.

Otherwise, the inventive partial oxidation process can be executed in a manner entirely corresponding to the teachings of DE 10 2007 019 597 A or of WO 2008/104577, or of WO 2011/134932.

More particularly, the source used for the (meth)acrolein required for the inventive partial oxidation may directly be the (meth)acrolein-comprising product gas mixture of a heterogeneously catalyzed partial oxidation of a $C_3/C_4$ precursor compound (for example propene or isobutene), without any need to remove the (meth)acrolein from such a product gas mixture beforehand.

The (meth)acrylic acid can be removed from the product gas mixture of the partial oxidation in a known manner, for example by first converting the (meth)acrylic acid to the condensed phase by absorptive and/or condensative measures. Subsequent thermal separation processes, such as rectification and/or crystallization, can subsequently isolate (meth)acrylic acid in any purity from the condensed phase (cf. DE 602004924 T and WO 2006/114428 and the prior art cited in these documents).

The present invention further provides eggshell catalysts obtainable by the process of the invention, consisting of a geometric shaped support body and one or more catalytically active multielement oxides, wherein the pore volume and the active composition content meet the following condition:

$$PV/AM^{0.55}>0.140,$$

preferably $$PV/AM^{0.55}>0.145,$$

more preferably $$PV/AM^{0.55}>0.150,$$

most preferably $$PV/AM^{0.55}>0.155,$$

where PV is the pore volume in ml/g and AM is the active composition content in % by weight and the pore volume is determined after the removal of the binder, and the abrasion level is less than 5.5% by weight, preferably less than 4.5% by weight, more preferably less than 3.5% by weight, most preferably less than 2.5% by weight, and the abraded material is determined before the removal of the binder.

The pore volume is determined by low-pressure mercury/helium pycnometry according to DIN 66133. Any binder still present is removed in an air stream at 300° C. For the measurement, 1.0 to 2.2 g of the sample is weighed out. The measurement is conducted for pores in the range from 3.6 nm to 300 μm. About 80 points are recorded. The surface tension is 0.485 N/m and the contact angle is 140°.

The abrasion level is determined by the method described in EP 3 056 482 A1 in paragraph [0055] (referred to therein as "Attrition Resistance"). The measurement is conducted with the sample still containing binder.

Geometric shaped support bodies used were preferably hollow cylindrical geometric shaped support bodies having a length of 3 to 8 mm, an external diameter of 4 to 8 mm and a wall thickness of 1 to 2 mm.

The eggshell catalyst preferably has an active composition content, based on the total mass, of 5% to 50% by weight.

The catalytically active multielement oxide comprises, for example, the elements Mo, V and optionally W or the elements Mo, Bi and optionally Fe.

The catalytically active multielement oxide preferably comprises the elements Mo, W, V, Cu and optionally Sb, wherein the ratio of the elements conforms to the general formula (I)

$$Mo_{12}W_aV_bCu_cSb_d \quad (I)$$

where a=0.4 to 5.0, preferably 0.6 to 3.5, more preferably 0.8 to 2.5, most preferably 1.0 to 2.0, b=1.0 to 6.0, preferably 1.5 to 5.5, more preferably 2.0 to 5.0, most preferably 2.5 to 4.5, c=0.2 to 3.0, preferably 0.4 to 2.8, more preferably 0.6 to 2.6, most preferably 0.8 to 2.4, and d=0.0 to 2.0, preferably 0.1 to 1.6, more preferably 0.2 to 1.2, most preferably 0.3 to 0.8, and the molar proportion of the element Mo in the total amount of all non-oxygen elements is from 5 to 95 mol %, preferably from 10 to 90 mol %, more preferably from 15 to 85 mol %, most preferably from 20 to 80 mol %.

The present invention further provides processes for heterogeneously catalyzed partial gas phase oxidation over a fixed catalyst bed, wherein the fixed catalyst bed comprises an eggshell catalyst of the invention.

The measurements were conducted as described in WO 2011/134932 A1. In each case, the cumulative proportion of the particles in % by volume was plotted against particle size in μm. The measurements were effected at two different blowing gas pressures (triangle: p=0.2 bar; square: p=1.0 bar).

Figure 3:
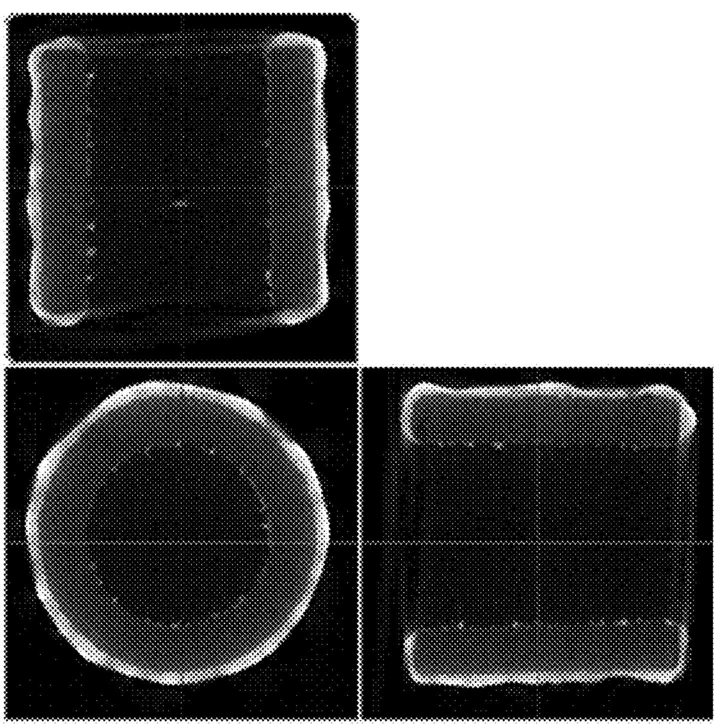

FIG. 3 shows an x-ray image of the eggshell catalyst with an active composition content of 25% by weight from example 7 (noninventive).

Figure 4:
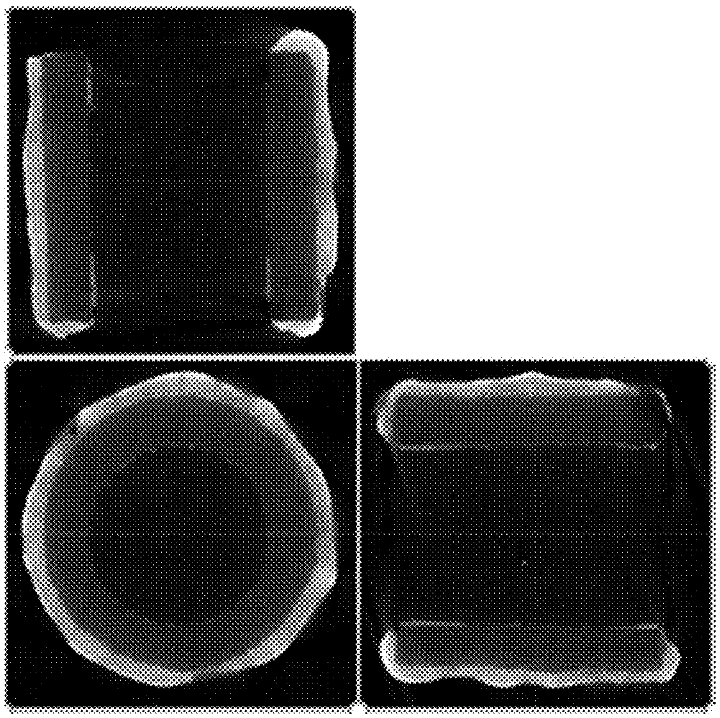

FIG. 4 shows an x-ray image of the eggshell catalyst with an active composition content of 25% by weight from example 8 (inventive).

Figure 5:
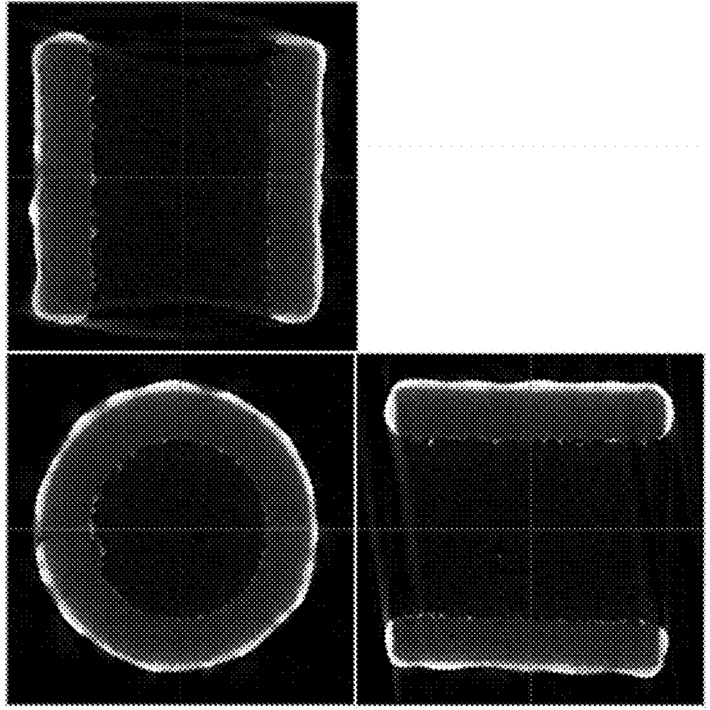

FIG. 5 shows an x-ray image of the eggshell catalyst with an active composition content of 20% by weight from example 9 (noninventive).

Figure 6:
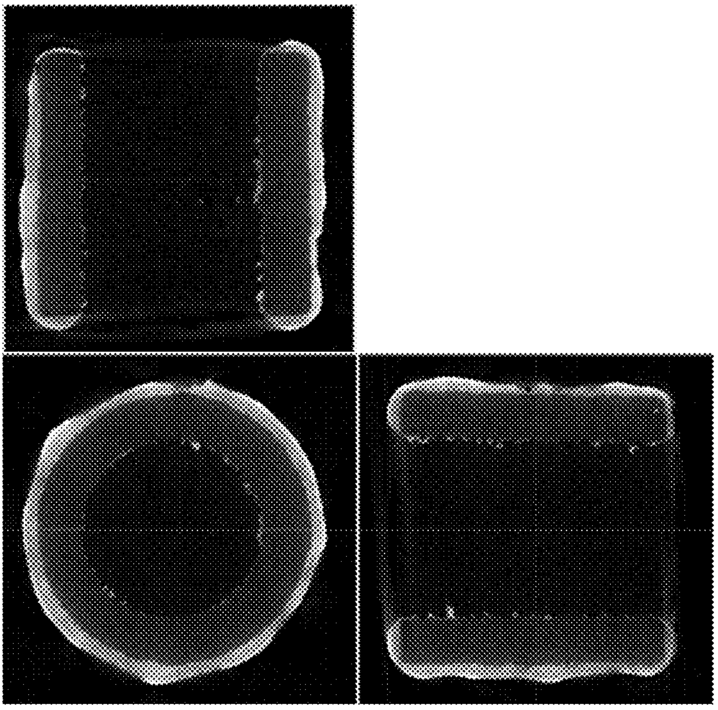

FIG. 6 shows an x-ray image of the eggshell catalyst with an active composition content of 20% by weight from example 10 (inventive).

Figure 7:
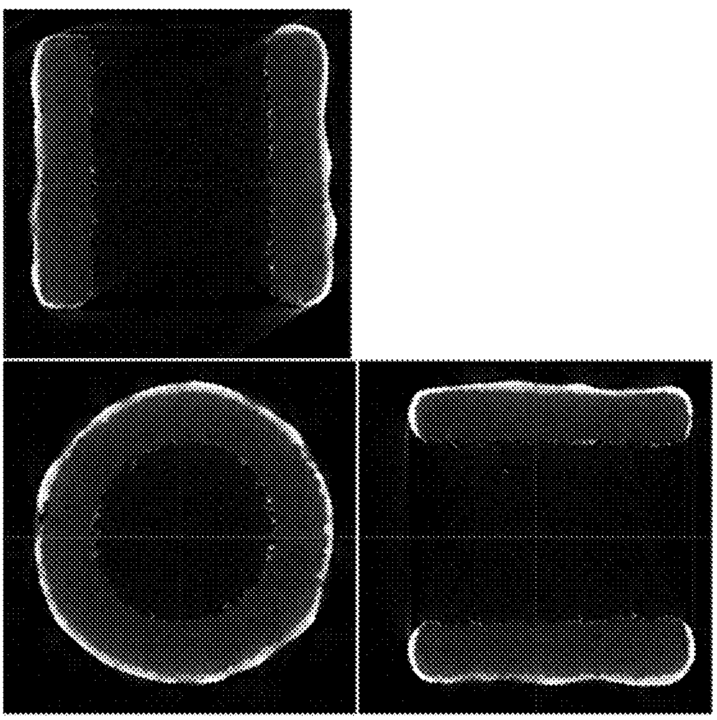

FIG. 7 shows an x-ray image of the eggshell catalyst with an active composition content of 15% by weight from example 11 (noninventive).

Figure 8:
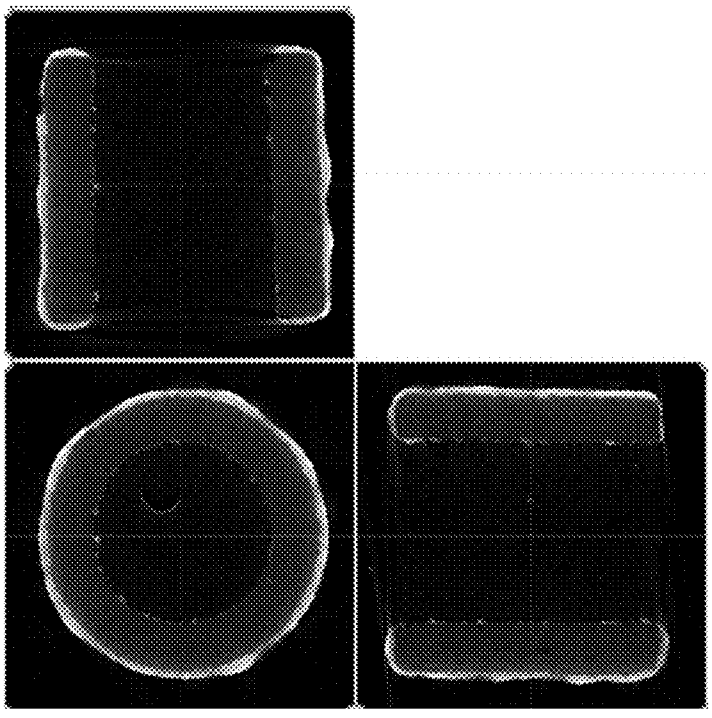

FIG. 8 shows an x-ray image of the eggshell catalyst with an active composition content of 15% by weight from example 12 (inventive).

Comparison of the x-ray images shows much thicker layers of active composition with the same active composition content, as a result of the more porous structure of the eggshell catalysts of the invention.

Thus, the present invention encompasses especially the following embodiments of the invention:

1. A process for producing an eggshell catalyst, comprising the coating of an outer surface of a geometric shaped support body with
   a) one or more catalytically active multielement oxides and one or more liquid binders, wherein the binder(s) is/are removed later, or
   b) one or more powders P and one or more liquid binders, wherein the powder(s) P, after the coating, is/are converted by thermal treatment to one or more catalytic reactive multielement oxides, wherein the coating is conducted in a horizontal mixer and the Froude number during the coating in the horizontal mixer is from 0.0040 to 0.1200.
2. The process according to embodiment 1, wherein the Froude number during the coating in the horizontal mixer is from 0.0080 to 0.1000.
3. The process according to embodiment 1 or 2, wherein the Froude number during the coating in the horizontal mixer is from 0.0120 to 0.0800.
4. The process according to any of embodiments 1 to 3, wherein the Froude number during the coating in the horizontal mixer is from 0.0160 to 0.0600.
5. The process according to any of embodiments 1 to 4, wherein the diameter of the mixing drum of the horizontal mixer is from 0.5 to 2.5 m.
6. The process according to any of embodiments 1 to 5, wherein the length of the mixing drum of the horizontal mixer is from 0.25 to 1.5 m.
7. The process according to any of embodiments 1 to 6, wherein hollow cylindrical geometric shaped support bodies having a length of 3 to 8 mm, an external diameter of 4 to 8 mm and a wall thickness of 1 to 2 mm are used as geometric shaped support bodies.
8. The process according to any of embodiments 1 to 7, wherein the eggshell catalyst, based on the overall composition, has an active composition content of 5% to 50% by weight.
9. The process according to any of embodiments 1 to 8, wherein from 0.05 to 0.5 kg/kg of the liquid binder is used in the coating, based on the active composition.
10. The process according to any of embodiments 1 to 9, wherein from 0.10 to 0.4 kg/kg of the liquid binder is used in the coating, based on the active composition.
11. The process according to any of embodiments 1 to 10, wherein from 0.15 to 0.3 kg/kg of the liquid binder is used in the coating, based on the active composition.
12. The process according to any of embodiments 1 to 11, wherein the liquid binder is water, an organic solvent, a solution of an organic substance in water, a solution of an organic substance in an organic solvent and/or a solution of an organic substance in an aqueous solution of an organic solvent.

13. The process according to any of embodiments 1 to 12, wherein the liquid binder is a solution consisting of 20 to 90% by weight of water and 10 to 80% by weight of an organic compound.
14. The process according to any of embodiments 1 to 13, wherein the liquid binder consists of 20 to 90% by weight of water and 10 to 80% by weight of glycerol.
15. The process according to any of embodiments 1 to 14, wherein the liquid binder consists of 50 to 90% by weight of water and 10 to 50% by weight of glycerol.
16. The process according to any of embodiments 1 to 15, wherein the liquid binder consists of 70 to 80% by weight of water and 20 to 30% by weight of glycerol.
17. The process according to any of embodiments 1 to 16, wherein the duration of coating is from 0.5 to 10 minutes per % by weight of active composition content.
18. The process according to any of embodiments 1 to 17, wherein the duration of coating is from 1.0 to 7 minutes per % by weight of active composition content.
19. The process according to any of embodiments 1 to 18, wherein the duration of coating is from 1.5 to 4 minutes per % by weight of active composition content.
20. The process according to any of embodiments 1 to 19, wherein the catalytically active multielement oxide or the powder P comprises the elements Mo, V and optionally W or the elements Mo, Bi and optionally Fe.
21. The process according to any of embodiments 1 to 20, wherein the catalytically active multielement oxide comprises the elements Mo, W, V, Cu and optionally Sb, where the ratio of the elements conforms to the general formula (I)

$$Mo_{12}W_aV_bCu_cSb_d \quad (I)$$

where
 a=0.4 to 5.0,
 b=1.0 to 6.0,
 c=0.2 to 3.0 and
 d=0.0 to 2.0,
 and the molar proportion of the element Mo in the total amount of all non-oxygen elements is from 5 to 95 mol %.
22. The process according to embodiment 21, wherein the stoichiometric coefficient a of the element W in the general formula (I) is from 0.6 to 3.5.
23. The process according to embodiment 21 or 22, wherein the stoichiometric coefficient a of the element W in the general formula (I) is from 0.8 to 2.5.
24. The process according to any of embodiments 21 to 23, wherein the stoichiometric coefficient a of the element W in the general formula (I) is from 1.0 to 2.0.
25. The process according to any of embodiments 21 to 24, wherein the stoichiometric coefficient b of the element V in the general formula (I) is from 1.5 to 5.5.
26. The process according to any of embodiments 21 to 25, wherein the stoichiometric coefficient b of the element V in the general formula (I) is from 2.0 to 5.0.
27. The process according to any of embodiments 21 to 26, wherein the stoichiometric coefficient b of the element V in the general formula (I) is from 2.5 to 4.5.
28. The process according to any of embodiments 21 to 27, wherein the stoichiometric coefficient c of the element Cu in the general formula (I) is from 0.4 to 2.8.
29. The process according to any of embodiments 21 to 28, wherein the stoichiometric coefficient c of the element Cu in the general formula (I) is from 0.6 to 2.6.
30. The process according to any of embodiments 21 to 29, wherein the stoichiometric coefficient c of the element Cu in the general formula (I) is from 0.8 to 2.4.
31. The process according to any of embodiments 21 to 30, wherein the stoichiometric coefficient d of the element Sb in the general formula (I) is from 0.1 to 1.6.
32. The process according to any of embodiments 21 to 31, wherein the stoichiometric coefficient d of the element Sb in the general formula (I) is from 0.2 to 1.2.
33. The process according to any of embodiments 21 to 32, wherein the stoichiometric coefficient d of the element Sb in the general formula (I) is from 0.3 to 0.8.
34. The process according to any of embodiments 21 to 33, wherein the molar proportion of the element Mo in the total amount of all non-oxygen elements is from 10 to 90 mol %.
35. The process according to any of embodiments 21 to 34, wherein the molar proportion of the element Mo in the total amount of all non-oxygen elements is from 15 to 85 mol %.
36. The process according to any of embodiments 21 to 35, wherein the molar proportion of the element Mo in the total amount of all non-oxygen elements is from 20 to 80 mol %.
37. An eggshell catalyst consisting of a geometric shaped support body and one or more catalytically active multielement oxides applied to the outer surface of the geometric shaped support body, obtainable by a process of embodiments 1 to 36, wherein the pore volume and the active composition content meet the following condition:

$$PV/AM^{0.55}>0.140,$$

where PV is the pore volume in ml/g and AM is the active composition content in % by weight and the pore volume is determined after the removal of the binder, and the abrasion level is less than 5.5% by weight and the abraded material is determined before the removal of the binder.
38. The eggshell catalyst according to embodiment 37, wherein the pore volume and active composition content meet the following condition:

$$PV/AM^{0.55}>0.145,$$

where PV is the pore volume in ml/g and AM is the active composition content in % by weight.
39. The eggshell catalyst according to embodiment 37 or 38, wherein the pore volume and active composition content satisfy the following condition:

$$PV/AM^{0.55}>0.150,$$

where PV is the pore volume in ml/g and AM is the active composition content in % by weight.
40. The eggshell catalyst according to any of embodiments 37 to 39, wherein the pore volume and active composition content meet the following condition:

$$PV/AM^{0.55}>0.145,$$

where PV is the pore volume in ml/g and AM is the active composition content in % by weight.
41. The eggshell catalyst according to any of embodiments 37 to 40, wherein the abrasion level is less than 4.5% by weight.
42. The eggshell catalyst according to any of embodiments 37 to 41, wherein the abrasion level is less than 3.5% by weight.

43. The eggshell catalyst according to any of embodiments 37 to 42, wherein the abrasion 50 level is less than 2.5% by weight.
44. The eggshell catalyst according to any of embodiments 37 to 43, wherein hollow cylindrical geometric shaped support bodies having a length of 3 to 8 mm, an external diameter of 4 to 8 mm and a wall thickness of 1 to 2 mm were used.
45. The eggshell catalyst according to any of embodiments 37 to 44, wherein the eggshell catalyst, based on the overall composition, has an active composition content of 5% to 50% by weight.
46. The eggshell catalyst according to any of embodiments 37 to 45, wherein the catalytically active multi-element oxide or the powder P comprises the elements Mo, V and optionally W or the elements Mo, Bi and optionally Fe.
47. The eggshell catalyst according to any of embodiments 37 to 46, wherein the catalytically active multi-element oxide comprises the elements Mo, W, V, Cu and optionally Sb, where the ratio of the elements conforms to the general formula (I)

$$Mo_{12}W_aV_bCu_cSb_d \quad (I)$$

where
a=0.4 to 5.0,
b=1.0 to 6.0,
c=0.2 to 3.0 and
d=0.0 to 2.0,
and the molar proportion of the element Mo in the total amount of all non-oxygen elements is from 5 to 95 mol %.
48. The eggshell catalyst according to embodiment 47, wherein the stoichiometric coefficient a of the element Win the general formula (I) is from 0.6 to 3.5.
49. The eggshell catalyst according to embodiment 47 or 48, wherein the stoichiometric coefficient a of the element Win the general formula (I) is from 0.8 to 2.5.
50. The eggshell catalyst according to any of embodiments 47 to 49, wherein the stoichiometric coefficient a of the element W in the general formula (I) is from 1.0 to 2.0.
51. The eggshell catalyst according to any of embodiments 47 to 50, wherein the stoichiometric coefficient b of the element V in the general formula (I) is from 1.5 to 5.5.
52. The eggshell catalyst according to any of embodiments 47 to 51, wherein the stoichiometric coefficient b of the element V in the general formula (I) is from 2.0 to 5.0.
53. The eggshell catalyst according to any of embodiments 47 to 52, wherein the stoichiometric coefficient b of the element V in the general formula (I) is from 2.5 to 4.5.
54. The eggshell catalyst according to any of embodiments 47 to 53, wherein the stoichiometric coefficient c of the element Cu in the general formula (I) is from 0.4 to 2.8.
55. The eggshell catalyst according to any of embodiments 47 to 54, wherein the stoichiometric coefficient c of the element Cu in the general formula (I) is from 0.6 to 2.6.
56. The eggshell catalyst according to any of embodiments 47 to 55, wherein the stoichiometric coefficient c of the element Cu in the general formula (I) is from 0.8 to 2.4.
57. The eggshell catalyst according to any of embodiments 47 to 56, wherein the stoichiometric coefficient d of the element Sb in the general formula (I) is from 0.1 to 1.6.
58. The eggshell catalyst according to any of embodiments 47 to 57, wherein the stoichiometric coefficient d of the element Sb in the general formula (I) is from 0.2 to 1.2.
59. The eggshell catalyst according to any of embodiments 47 to 58, wherein the stoichiometric coefficient d of the element Sb in the general formula (I) is from 0.3 to 0.8.
60. The eggshell catalyst according to any of embodiments 47 to 59, wherein the catalytically active multi-element oxide additionally comprises at least one of the elements Ta, Cr, Ce, Ni, Co, Fe, Mn, Zn, Nb, Bi, Li, Na, K, Rb, Cs, Mg, Ca, Sr, Ba, Si, Al, Ti or Zr.
61. The eggshell catalyst according to any of embodiments 47 to 60, wherein the molar proportion of the element Mo in the total amount of all non-oxygen elements is from 10 to 90 mol %.
62. The eggshell catalyst according to any of embodiments 47 to 61, wherein the molar proportion of the element Mo in the total amount of all non-oxygen elements is from 15 to 85 mol %.
63. The eggshell catalyst according to any of embodiments 47 to 62, wherein the molar proportion of the element Mo in the total amount of all non-oxygen elements is from 20 to 80 mol %.
64. The eggshell catalyst according to any of embodiments 47 to 63, wherein the specific BET surface area of the catalytically active multielement oxides is from 10 to 35 $m^2/g$.
65. The eggshell catalyst according to any of embodiments 47 to 64, wherein the specific BET surface area of the catalytically active multielement oxides is from 13 to 32 $m^2/g$.
66. The eggshell catalyst according to any of embodiments 47 to 65, wherein the specific BET surface area of the catalytically active multielement oxides is from 16 to 29 $m^2/g$.
67. The eggshell catalyst according to any of embodiments 47 to 66, wherein the specific BET surface area of the catalytically active multielement oxides is from 19 to 26 $m^2/g$.
68. A process for heterogeneously catalyzed partial gas phase oxidation over a fixed catalyst bed, wherein the fixed catalyst bed comprises an eggshell catalyst according to any of embodiments 47 to 67.
69. A process for heterogeneously catalyzed partial gas phase oxidation of acrolein to acrylic acid over a fixed catalyst bed, wherein the fixed catalyst bed comprises an eggshell catalyst according to any of embodiments 47 to 67.
70. The use of an eggshell catalyst according to any of embodiments 47 to 67 as catalysts for heterogeneously catalyzed partial gas phase oxidation.
71. The use of an eggshell catalyst according to any of embodiments 47 to 67 as catalysts for the heterogeneously catalyzed partial gas phase oxidation of acrolein to acrylic acid.

EXAMPLES

Example 1 (Comparative Example)

Annular Eggshell Catalyst C1 with the Catalytically Active Oxide Composition $Mo_{12}V_3W_{1.2}Cu_{2.4}O_x$ and $MoO_3$ Production of the Eggshell Catalyst:

A first solution was produced in a 1.75 $m^3$ jacketed stainless steel vessel with a beam stirrer. For this purpose, an initial charge of 274 l of water at 25° C. was stirred at 70 rpm. At a metering rate of 50 kg/h, 16.4 kg of copper(II) acetate hydrate (content: 32.0% by weight of Cu) was added. The first solution was stirred for a further 30 minutes.

Spatially separately therefrom, a second solution was produced in a 1.75 $m^3$ jacketed stainless steel vessel with a beam stirrer. An initial charge of 614 l of water was heated to 40° C. at 70 rpm. At a metering rate of 300 kg/h, 73 kg of ammonium heptamolybdate tetrahydrate (81.5% by weight of $MoO_3$) was stirred in at 40° C. Then the contents were heated to 90° C. within 30 min. Ata metering rate of 150 kg/h, 12.1 kg of ammonium metavanadate (77.6% by weight of $V_2O_5$) was stirred in at 90° C. The contents were stirred for a further 40 minutes. Subsequently, at a metering rate of 50 kg/h, 10.7 kg of ammonium paratungstate heptahydrate (89.6% by weight of $WO_3$) was stirred in at 90° C. The contents were stirred for a further 30 minutes.

The second solution was cooled down to 80° C., and then the first solution was stirred into the second solution. 133 l of a 25% by weight aqueous $NH_3$ solution at a temperature of 25° C. was added to the resultant mixture. Stirring gave rise to a clear solution, which briefly had a temperature of 65° C. and a pH of 8.5. The contents of the stainless steel vessel were transferred to a further 1.75 $m^3$ jacketed stainless steel vessel with a beam stirrer. The contents were stirred at 40 rpm and heated to 80° C. The pH was kept at 8.5 by automatic metered addition of a 25% by weight aqueous $NH_3$ solution.

The resultant solution was introduced into an FS 15 spray tower (GEA Niro, Soeborg, Denmark) by means of a rotary atomizer at 15 000 rpm. The drying was conducted in a hot air stream at an inlet temperature of 350° C.±5° C. The pressure in the spray tower was 1 mbar, and the gas volume flow rate of combustion air was 2300 $m^3$ (STP)/h. The solution was metered in such that the exit temperature was 110±5° C. The particle size distribution of the resultant spray powder is shown in FIG. 3 of DE 10 2007 010 422 A1.

75 kg of the resultant spray powder was metered into a VM 160 kneader with sigma paddles (Aachener Misch- and Knetmaschinen Fabrik Peter Küpper GmbH & Co. KG, Würselen, Germany) and kneaded with addition of 6.5 l of acetic acid (about 100% strength by weight, glacial acetic acid) and 5.2 l of water (screw speed: 15 rpm). After a kneading time of 4 to 5 minutes, a further 6.5 l of water was added and the kneading process was continued until 30 minutes had elapsed (kneading temperature about 40 to 50° C.). During the kneading, the power consumption of the kneader was monitored. In the event of a rise in power consumption above 25%, 1 l of water was added if required.

Thereafter, the kneading material was emptied into an extruder of the G 103-35 10/07 A-572K type (6" Extruder W Packer; The Bonnot Company, Akron, USA/Ohio) and was shaped by means of the extruder to extrudates (length: 1 to 10 cm; diameter 6 mm). In a three-zone belt drier, the extrudates were dried at a belt speed of 10 cm per minute and for a dwell time of 64 minutes. The gas temperatures were 90 to 95° C. (zone 1), about 115° C. (zone 2) and about 125° C. (zone 3). The dried extrudates formed the precursor composition to be subjected to thermal treatment.

Figure 1:
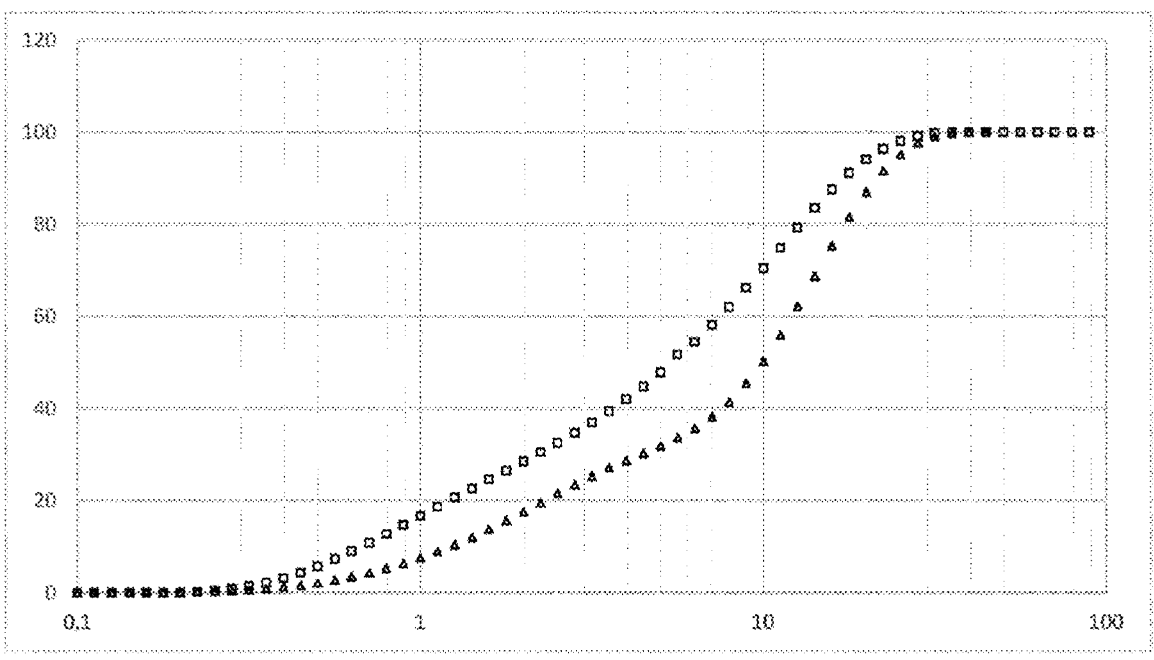
FIG. 1 shows an illustrative particle size distribution of the powder P.

The thermal treatment was conducted in a rotary furnace apparatus according to FIG. 1 of U.S. Pat. No. 7,589,046 with the dimensions and auxiliary elements according to the illustrative embodiment in the description of that document and under the following conditions:

- thermal treatment was effected batchwise with an amount of material of 306 kg;
- the angle of inclination of the rotary tube to the horizontal was about 0°;
- the rotary tube rotated to the right at 1.5 rpm;
- throughout the thermal treatment, a gas stream of 205 $m^3$ (STP)/h was conducted through the rotary tube, which (after displacement of the air originally present) had the following composition and was supplemented by a further 25 $m^3$ (STP)/h of barrier gas nitrogen at its outlet from the rotary tube:

80 $m^3$ (STP)/h composed of baseload nitrogen (20) and gases released in the rotary tube, 25 $m^3$ (STP)/h of barrier gas nitrogen (11), 30 $m^3$ (STP)/h of air (splitter (21)) and 70 $m^3$ (STP)/h of recirculated cycle gas (19).

The barrier gas nitrogen was supplied at a temperature of 25° C. The mixture of the other gas streams, coming from the heater, was guided into the rotary tube in each case at the temperature of the material within the rotary tube:

- within 10 hours, the material temperature was heated from 25° C. in an essentially linear manner to 300° C., then the material temperature was heated within 2 hours in an essentially linear manner to 360° C., subsequently the material temperature was lowered in an essentially linear manner to 350° C. within 7 h, then the material temperature was increased in an essentially linear manner to 420° C. within 2 hours, and this material temperature was maintained for 30 minutes;
- then the 30 $m^3$ (STP)/h of air in the gas stream conducted through the rotary tube was replaced by a corresponding increase in the baseload nitrogen (which ended the actual thermal treatment operation), the heating of the rotary tube was switched off, and the material was cooled down to a temperature below 100° C. and ultimately to ambient temperature within 2 hours by switching on the rapid cooling of the rotary tube by suction of ambient air, wherein the gas stream was supplied to the rotary tube at a temperature of 25° C.;
- throughout the thermal treatment, the pressure (immediately) beyond the rotary tube exit of the gas stream was 0.2 mbar below the outside pressure.

The oxygen content of the atmosphere at the exit from the rotary tube furnace in all phases of the thermal treatment was 2.9% by volume.

The resultant catalytic active composition was ground by means of a biplex crossflow classifying mill of the BQ 500 type (Hosokawa-Alpine AG, Augsburg, Germany) to give a finely divided powder. 24 long blades were installed here in the grinding pathways. The mill speed was 2500 rpm. The ventilator throttle vent was fully opened. The metered addition was adjusted to 2.5 rpm. The volume flow rate of output air was 1300 $m^3$/h, the pressure differential 10 to 20 mbar. The particle size distribution of the above ground catalytic active composition is shown by FIG. 1 (the measurement was conducted analogously to the example of U.S. Pat. No. 9,238,217).

Figure 2:
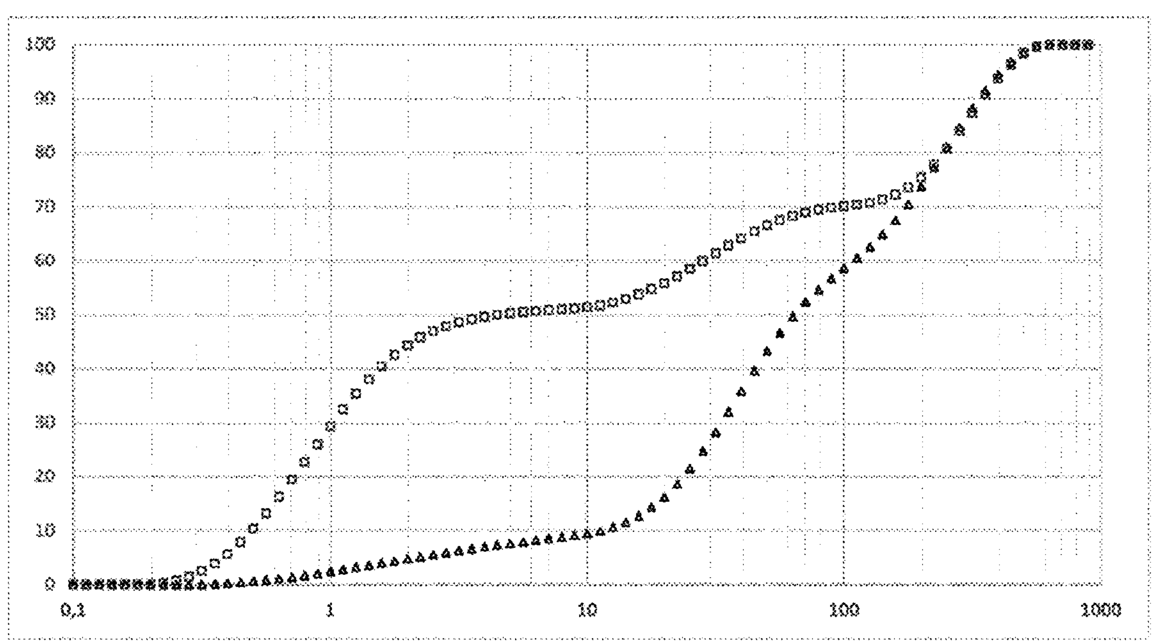
FIG. 2 shows a particle size distribution of finely divided $MoO_3$.

The ground catalytic active composition, analogously to example 2 of U.S. Pat. No. 8,318,631, was admixed with 15% by weight of finely divided $MoO_3$ ("Molybdenum Trioxide I", Mo content 66.6% by weight, BET surface area 1 $m^2$/g; H. C. Starck GmbH, Goslar, Germany), based on the catalytic active composition. The particle size distribution of the finely divided $MoO_3$ is shown in FIG. 2. Finally, the mixture was mixed homogeneously in a GT 550 multimixer (Rotor Lips AG, Uetendorf, Switzerland) at setting 8 over a period of 1 minute. The resulting finely divided mixture was used to produce an annular eggshell catalyst.

For the coating operation, 70 kg of annular shaped support bodies (external diameter 7 mm, length 3 mm, internal diameter 4 mm, surface roughness IR, 45 μm, total pore volume about 1% by volume based on the volume of the support body; cf. DE 21 35 620 A1) of the C220 steatite type (CeramTec GmbH, Plochingen, Germany) was introduced into a horizontal mixer of the Hi-Coater type (Gebrüder Lödige Maschinenbau GmbH, Paderborn, Germany) with a drum diameter of 1000 mm and capacity about 600 l. Subsequently, the horizontal mixer was set in rotation at 16 rpm.

A nozzle of the 0.5 mm/90° type (Düsen-Schlick GmbH, Coburg, Germany) was used to spray 4.0 liters of a solution of 75% by weight of water and 25% by weight of glycerol onto the support bodies at a liquid supply pressure of about 1.8 bar within 40 minutes. Simultaneously, within the same period of time, 18.2 kg of the finely divided mixture having a specific surface area of 14 $m^2$/g was metered in continuously outside the spray cone of the atomizer nozzle by means of an agitated channel. During the coating, the finely divided mixture supplied was taken up completely onto the surface of the support body; no agglomeration of the finely divided mixture or formation of twinned catalyst bodies was observed. After the addition of finely divided mixture and solution had ended, air at 110° C. (about 400 $m^3$/h) was blown into the horizontal mixer at a speed of rotation of 2 rpm. A sample of about 2 kg of coated support bodies was taken. The glycerol still present in the sample was removed in a UM 400 air circulation drying cabinet (capacity 53 l, air flow rate 800 l/h; Memmert GmbH & Co. KG, Schwabach, Germany). The heat treatment conditions were identical to those of example C1 of U.S. Pat. No. 9,238,217. The annular eggshell catalysts C1 taken from the air circulation drying cabinet, based on the total mass thereof, had an active composition content of 22.0% by weight, a pore volume of 0.046 ml/g (measured by a mercury porosimeter) and an abrasion level of 0.10% by weight.

Testing of the Eggshell Catalysts:

A reaction tube (stainless steel (material 1.4541); external diameter 30 mm; wall thickness 2 mm; internal diameter 26 mm; length 464 cm) was charged from the top downward as follows:

Section 1: length 80 cm
  empty tube;
Section 2: length 60 cm
  preliminary bed of steatite rings of geometry 7 mm×7 mm×4 mm (external diameter×length×internal diameter; C 220 steatite);
Section 3: length 100 cm
  fixed catalyst bed composed of a homogeneous mixture consisting of 20% by weight of steatite rings of geometry 7 mm×3 mm×4 mm (external diameter×length×internal diameter; C 220 steatite) and 80% by weight of the eggshell catalyst;
Section 4: length 200 cm
  fixed catalyst bed consisting exclusively of the eggshell catalyst as in section 3;
Section 5: length 10 cm
  downstream bed of the same steatite rings as in section 2;
Section 6: length 11.5 cm
  Catalyst base made of stainless steel (material 1.4541) for accommodation of the fixed catalyst bed.

A reaction gas mixture conducted through the respective reaction tube charged as described above, flowing through the reaction tube from the top downward, had the following contents:

| | |
|---|---|
| 4.3% | by vol. of acrolein, |
| 0.3% | by vol. of propene, |
| 0.2% | by vol. of propane, |
| 0.3% | by vol. of acrylic acid, |
| 5.1% | by vol. of oxygen, |
| 0.4% | by vol. of carbon oxides, |
| 7.0% | by vol. of water and |
| 82.4% | by vol. of nitrogen. |

The feed temperature of the reaction gas mixture (at the inlet into the reaction tube) was 210° C., and the space velocity of acrolein on the fixed catalyst bed (as defined in DE 199 27 624 A1) was 100 l (STP)/h.

Over the length of the reaction tube (apart from the last 10 cm of the empty tube in section 1 and the last 3 cm of the tube in section 6), a stirred and externally electrically heated salt bath (mixture of 53% by weight of potassium nitrate, 40% by weight of sodium nitrite and 7% by weight of sodium nitrate; 50 kg of salt melt) flowed around the reaction tube (the flow rate at the tube was 3 m/s). The salt bath temperature TB (with which the salt bath was supplied) was set in all cases so as to result in an acrolein conversion of 99.3 mol % based on a single pass of the reaction gas mixture through the fixed catalyst bed. Along the reaction tube, there was no change in the salt bath temperature owing to additional heating (the salt bath emitted more heat than was released by the reaction tube to the salt bath).

The selectivity of acrylic acid formation ($S^{AS}$ (mol %)) in this document is understood to mean:

$$S^{AA} = \frac{\text{number of moles of acrolein converted to acrylic acid}}{\text{number of moles of acrolein converted overall}} \times 100.$$

The selectivity of $CO_x$ formation (total combustion) is calculated analogously, including the stoichiometric factor of 3.

An active composition (catalyst) leading to the same conversion at lower temperature under otherwise unchanged reaction conditions has a higher activity.

The conversion of acrolein ($C^{AC}$ (mol %)) in this document is understood to mean:

$$C^{AC} = \frac{\text{number of moles of acrolein converted overall}}{\text{number of moles of acrolein converted overall}} \times 100 \text{ mol \%}.$$

Table 1 below shows the results obtained as a function of the eggshell catalyst used after 100 hours of operation.

Example 2

Annular Eggshell Catalyst WE1 with the Catalytically Active Oxide Composition $Mo_{12}V_3W_{1.2}Cu_{2.4}O_x$ and $MoO_3$ The procedure was as in example 1. For the coating operation, the horizontal mixer rotated at 10 rpm rather than at 16 rpm.

The annular eggshell catalysts WE1, based on the total mass thereof, had an active composition content of 22.0% by weight, a pore volume of 0.053 ml/g (measured by a mercury porosimeter) and an abrasion level of 0.17% by weight.

Example 3

Annular Eggshell Catalyst WE2 with the Catalytically Active Oxide Composition $Mo_{12}V_3W_{1.2}Cu_{2.4}O_x$ and $MoO_3$ The procedure was as in example 1. For the coating operation, the horizontal mixer rotated at 7 rpm rather than at 16 rpm.

The annular eggshell catalysts WE2, based on the total mass thereof, had an active composition content of 22.0% by weight, a pore volume of 0.062 ml/g (measured by mercury porosimeter) and an abrasion level of 1.05% by weight.

Example 4

Annular Eggshell Catalyst WE3 with the Catalytically Active Oxide Composition $Mo_{12}V_3W_{1.2}Cu_{2.4}O_x$ and $MoO_3$ The procedure was as in example 1. For the coating operation, the horizontal mixer rotated at 4 rpm rather than at 16 rpm.

The annular eggshell catalysts WE3, based on the total mass thereof, had an active composition content of 22.0% by weight, a pore volume of 0.065 ml/g (measured by mercury porosimeter) and an abrasion level of 4.75% by weight.

Example 5

Annular Eggshell Catalyst WE4 with the Catalytically Active Oxide Composition $Mo_{12}V_3W_{1.2}Cu_{2.4}O_x$ and $MoO_3$ The procedure was as in example 1. For the coating operation, the horizontal mixer rotated at 3 rpm rather than at 16 rpm.

The annular eggshell catalysts WE4, based on the total mass thereof, had an active composition content of 22.0% by weight, a pore volume of 0.078 ml/g (measured by mercury porosimeter) and an abrasion level of 4.43% by weight.

Example 6

Annular Eggshell Catalyst WE5 with the Catalytically Active Oxide Composition $Mo_{12}V_3W_{1.2}Cu_{2.4}O_x$ and $MoO_3$ The procedure was as in example 1. For the coating operation, the horizontal mixer rotated at 2 rpm rather than at 16 rpm.

The annular eggshell catalysts WE5, based on the total mass thereof, had an active composition content of 22.0% by weight, a pore volume of 0.086 ml/g (measured by mercury porosimeter) and an abrasion level of 7.37% by weight.

Example 7 (Comparative Example)

Annular Eggshell Catalyst C2 with the Catalytically Active Oxide Composition $Mo_{12}V_3W_{1.2}Cu_{1.2}O_x$ Analogously to example 1, a multielement oxide composition of stoichiometry $Mo_{12}V_3W_{1.2}Cu_{1.2}O_x$ was produced. The amount of copper(II) acetate hydrate for production of the first solution was reduced from 16.4 kg to 8.2 kg. The particle size distribution of the resultant spray powder is shown in FIG. 2 of WO 2011/134932 A1. No $MoO_3$ was included. The oxygen content of the atmosphere at the exit from the rotary tube furnace in all phases of the thermal treatment was less than 2.0% by volume rather than 2.9% by volume.

The hollow cylindrical support bodies used for coating had an external diameter of 6 mm, a length of 6 mm and an internal diameter of 4 mm. For coating of the support bodies, 4.5 liters of a solution of 75% by weight of water and 25% by weight of glycerol and 22.3 kg of the ground finely divided powder were metered in continuously within 50 minutes.

The annular eggshell catalysts C2, based on the total mass thereof, had an active composition content of 25.0% by weight, a pore volume of 0.061 ml/g (measured by mercury porosimeter) and an abrasion level of 0.29% by weight.

Example 8

Annular Eggshell Catalyst WE6 with the Catalytically Active Oxide Composition $Mo_{12}V_3W_{1.2}Cu_{1.2}O_x$ The procedure was as in example 7. For the coating operation, the horizontal mixer rotated at 7 rpm rather than at 16 rpm.

The annular eggshell catalysts WE6, based on the total mass thereof, had an active composition content of 25.7% by weight, a pore volume of 0.078 ml/g (measured by mercury porosimeter) and an abrasion level of 2.06% by weight.

Example 9 (Comparative Example)

Annular Eggshell Catalyst C3 with the Catalytically Active Oxide Composition $Mo_{12}V_3W_{1.2}Cu_{1.2}O_x$ Analogously to example 7, a multielement oxide composition of stoichiometry $Mo_{12}V_3W_{1.2}Cu_{1.2}O_x$ was produced.

For coating of the support bodies, 3.4 liters of a solution of 75% by weight of water and 25% by weight of glycerol and 17.5 kg of the ground finely divided powder were metered in continuously within 40 minutes.

The annular eggshell catalysts C3, based on the total mass thereof, had an oxidic eggshell content of 19.9% by weight, a pore volume of 0.051 ml/g (measured by a mercury porosimeter) and an abrasion level of 0.24% by weight.

Example 10

Annular Eggshell Catalyst WE7 with the Catalytically Active Oxide Composition $Mo_{12}V_3W_{1.2}Cu_{1.2}O_x$ The procedure was as in example 9. For the coating operation, the horizontal mixer rotated at 7 rpm rather than at 16 rpm.

The annular eggshell catalysts WE7, based on the total mass thereof, had an active composition content of 20.2% by weight, a pore volume of 0.067 ml/g (measured by mercury porosimeter) and an abrasion level of 1.56% by weight.

Example 11 (Comparative Example)

Annular Eggshell Catalyst C4 with the Catalytically Active Oxide Composition $Mo_{12}V_3W_{1.2}Cu_{1.2}O_x$ Analogously to example 7, a multielement oxide composition of stoichiometry $Mo_{12}V_3W_{1.2}Cu_{1.2}O_x$ was produced.

For coating of the support bodies, 2.4 liters of a solution of 75% by weight of water and 25% by weight of glycerol and 12.4 kg of the ground finely divided powder were metered in continuously within 30 minutes.

The annular eggshell catalysts C4, based on the total mass thereof, had an active composition content of 15.3% by weight, a pore volume of 0.046 ml/g (measured by mercury porosimeter) and an abrasion level of 0.19% by weight.

Example 12

Annular Eggshell Catalyst WE8 with the Catalytically Active Oxide Composition $Mo_{12}V_3W_{1.2}Cu_{1.2}O_x$ The procedure was as in example 11. For the coating operation, the horizontal mixer rotated at 7 rpm rather than at 16 rpm.

The annular eggshell catalysts WE8, based on the total mass thereof, had an active composition content of 15.4% by weight, a pore volume of 0.054 ml/g (measured by mercury porosimeter) and an abrasion level of 1.66% by weight.

Example 13 (Comparative Example)

Annular Eggshell Catalyst C5 with the Catalytically Active Oxide Composition $Mo_{12}V_3W_{1.2}Cu_{1.2}O_x$ Analogously to example 7, a multielement oxide composition of stoichiometry $Mo_{12}V_3W_{1.2}Cu_{1.2}O_x$ was produced.

For coating of the support bodies, 1.6 liters of a solution of 75% by weight of water and 25% by weight of glycerol and 7.8 kg of the ground finely divided powder were metered in continuously within 20 minutes.

The annular eggshell catalysts C5, based on the total mass thereof, had an active composition content of 10.4% by weight, a pore volume of 0.038 ml/g (measured by mercury porosimeter) and an abrasion level of 0.50% by weight.

Example 14

Annular Eggshell Catalyst WE9 with the Catalytically Active Oxide Composition $Mo_{12}V_3W_{1.2}Cu_{1.2}O_x$ The procedure was as in example 13. For the coating operation, the horizontal mixer rotated at 7 rpm rather than at 16 rpm.

The annular eggshell catalysts WE9, based on the total mass thereof, had an active composition content of 10.2% by weight, a pore volume of 0.041 ml/g (measured by mercury porosimeter) and an abrasion level of 1.60% by weight.

TABLE 1

Experimental results with $Mo_{12}V_3W_{1.2}Cu_{2.4}O_x$ and $MoO_3$ on support bodies (external diameter 7 mm, length 3 mm, internal diameter 4 mm)

| Ex. | Cat. | Speed [rpm] | Froude number | TB [° C.] | $S^{COx}$ [mol %] | PV [ml/g] | Abrasion level [% by wt.] | $PV/AM^{0.55}$ |
|---|---|---|---|---|---|---|---|---|
| 1*) | C1 | 16 | 0.1429 | 258 | 3.9 | 0.046 | 0.10 | 0.106 |
| 2 | WE1 | 10 | 0.0558 | 254 | 3.8 | 0.053 | 0.17 | 0.122 |
| 3 | WE2 | 7 | 0.0274 | 253 | 3.6 | 0.062 | 1.05 | 0.143 |
| 4 | WE3 | 4 | 0.0089 | 254 | 3.5 | 0.065 | 4.75 | 0.149 |
| 5 | WE4 | 3 | 0.0050 | 254 | 3.5 | 0.078 | 4.43 | 0.179 |
| 6*) | WE5 | 2 | 0.0022 | 254 | 3.6 | 0.086 | 7.37 | 0.198 |

*)comparative example

TB salt bath temperature (acrolein conversion of 99.3 mol %)

$S^{COx}$ $CO_x$ selectivity (total combustion)

PV pore volume

TABLE 2

Experimental results with $Mo_{12}V_3W_{1.2}Cu_{1.2}O_x$ on support bodies (external diameter 6 mm, length 6 mm, internal diameter 4 mm)

| Ex. | Cat. | Speed [rpm] | Froude number | AC [% by wt.] | TB [° C.] | $S^{COx}$ [mol %] | PV [ml/g] | Abrasion level [% by wt.] | $PV/AM^{0.55}$ |
|---|---|---|---|---|---|---|---|---|---|
| 7*) | C2 | 16 | 0.1429 | 25.0 | 247 | 3.5 | 0.061 | 0.29 | 0.131 |
| 8 | WE6 | 7 | 0.0558 | 25.7 | 247 | 3.2 | 0.078 | 2.06 | 0.167 |
| 9*) | C3 | 16 | 0.1429 | 19.9 | 256 | 3.1 | 0.051 | 0.24 | 0.124 |
| 10 | WE7 | 7 | 0.0558 | 20.2 | 251 | 2.7 | 0.067 | 1.56 | 0.162 |
| 11*) | C4 | 16 | 0.1429 | 15.3 | 259 | 2.8 | 0.046 | 0.19 | 0.131 |
| 12 | WE8 | 7 | 0.0558 | 15.4 | 258 | 2.5 | 0.054 | 1.66 | 0.153 |
| 13*) | C5 | 16 | 0.1429 | 10.4 | 270 | 2.3 | 0.038 | 0.5 | 0.135 |
| 14 | WE9 | 7 | 0.0558 | 10.2 | 271 | 2.0 | 0.041 | 1.6 | 0.145 |

*)comparative example

AC active composition

TB salt bath temperature (acrolein conversion of 99.3 mol %)

$S^{COx}$ $CO_x$ selectivity (total combustion)

PV pore volume

The invention claimed is:

1. A process for producing an eggshell catalyst, comprising the coating of the outer surface of a geometric shaped support body with a) one or more catalytically active multielement oxides and one or more liquid binders, wherein the binder is removed later, or b) one or more powders P and one or more liquid binders, wherein the powders P, after the coating, is converted by thermal treatment to one or more catalytically active multielement oxides, wherein the coating is conducted in a horizontal mixer and the Froude number during the coating in the horizontal mixer is from 0.0040 to 0.1200, wherein the diameter of the mixing drum on the horizontal mixer is from 0.5 to 2.5 m, and wherein the length of the mixing drum of the horizontal mixer is from 0.25 to 1.5 m.

2. The process according to claim 1, wherein the Froude number during the coating in the horizontal mixer is from 0.0160 to 0.0600.

3. The process according to claim 1, wherein hollow cylindrical geometric shaped support bodies having a length of 3 to 8 mm, an external diameter of 4 to 8 mm and a wall thickness of 1 to 2 mm are used as geometric shaped support bodies.

4. The process according to claim 1, wherein the eggshell catalyst, based on the overall composition, has an active composition content of 5% to 50% by weight.

5. The process according to claim 1, wherein from 0.05 to 0.5 kg/kg of the liquid binder is used in the coating, based on the active composition.

6. The process according to claim 1, wherein the duration of coating is from 0.5 to 10 minutes per % by weight of active composition content.

7. The process according to claim 1, wherein the catalytically active multielement oxide or the powders P comprises the elements Mo, V and optionally W or the elements Mo, Bi and optionally Fe.

8. The process according to claim 1, wherein the catalytically active multielement oxide or the powders P comprises the elements Mo, W, V, Cu and optionally Sb, where the ratio of the elements conforms to the general formula (I)

$$Mo_{12}W_aV_bCu_cSb_d \quad (I)$$

where a=0.4 to 5.0, b=1.0 to 6.0, c=0.2 to 2.4 and d=0.0 to 2.0, and the molar proportion of the element Mo in the total amount of all non-oxygen elements is from 5 to 95 mol %.

* * * * *